(12) United States Patent
Leventhal et al.

(10) Patent No.: US 10,740,540 B2
(45) Date of Patent: *Aug. 11, 2020

(54) TECHNIQUES FOR PROGRAMMATIC MAGNIFICATION OF VISIBLE CONTENT ELEMENTS OF MARKUP LANGUAGE DOCUMENTS

(71) Applicant: Freedom Scientific, Inc., St. Petersburg, FL (US)

(72) Inventors: Aaron M. Leventhal, Winchester, MA (US); Jeffrey P. Bigham, Pittsburgh, PA (US)

(73) Assignee: Freedom Scientific, Inc., St. Petersburg, FL (US)

( * ) Notice: Subject to any disclaimer, the term of this patent is extended or adjusted under 35 U.S.C. 154(b) by 955 days.

This patent is subject to a terminal disclaimer.

(21) Appl. No.: 14/569,571

(22) Filed: Dec. 12, 2014

(65) Prior Publication Data

US 2015/0169521 A1   Jun. 18, 2015

Related U.S. Application Data

(60) Provisional application No. 61/916,014, filed on Dec. 13, 2013.

(51) Int. Cl.
*G06F 40/154* (2020.01)
*G06F 40/14* (2020.01)
*G06F 40/103* (2020.01)

(52) U.S. Cl.
CPC .......... *G06F 40/154* (2020.01); *G06F 40/103* (2020.01); *G06F 40/14* (2020.01); *G06F 2203/04806* (2013.01)

(58) Field of Classification Search
CPC .. G06F 17/211; G06F 17/2247; G06F 17/227; G06F 2203/04806; G06F 40/154; G06F 40/103; G06F 40/14
See application file for complete search history.

(56) References Cited

U.S. PATENT DOCUMENTS 5,950,002 A * 9/1999 Hoford ............... G01S 7/52098
717/109
7,487,447 B1   2/2009 Jerger
(Continued)

OTHER PUBLICATIONS

International Preliminary Report on Patentability for International Application No. PCT/US2014/070160 dated Jun. 23, 2016.
(Continued)

*Primary Examiner* — Thu V Huynh
(74) *Attorney, Agent, or Firm* — Andriy Lytvyn; Smith & Hopen, P.A.

(57) ABSTRACT

Techniques for programmatically magnifying one or more visible content elements of at least one markup language document, so as to increase the display size of those visible content elements. A magnification facility may be configured to apply multiple different zoom techniques. The magnification facility may be configured to evaluate the markup language document(s) at a time that the document(s) are being processed for display to select which of the multiple different zoom techniques may be applied at a time to increase a display size of visible content elements relative to a default display size for those elements. The magnification facility may be incorporated within the markup language document(s) and executed by a viewing application that processes markup language documents. For example, the markup language document(s) may form a web page and the magnification facility may be implemented as scripting language code incorporated into the document(s) of the web page.

15 Claims, 17 Drawing Sheets

(56) References Cited

U.S. PATENT DOCUMENTS

| | | | |
|---|---|---|---|
| 7,701,471 B1* | 4/2010 | Young | G06F 3/04855 345/157 |
| 8,533,580 B1 | 9/2013 | Xu | |
| 9,196,227 B2* | 11/2015 | Leventhal | G06F 3/04812 |
| 9,355,608 B2* | 5/2016 | Takahashi | G09G 5/00 |
| 2004/0194030 A1* | 9/2004 | Altman | G06F 17/242 715/255 |
| 2004/0225962 A1* | 11/2004 | Ohashi | G06F 17/212 715/247 |
| 2004/0252119 A1 | 12/2004 | Hunleth et al. | |
| 2005/0283798 A1* | 12/2005 | Hunleth | G06F 3/0481 725/37 |
| 2006/0112330 A1* | 5/2006 | Iwasaki | G06T 11/60 715/246 |
| 2006/0146075 A1 | 7/2006 | Weiss et al. | |
| 2006/0146362 A1* | 7/2006 | Romney | G06F 3/1206 358/1.15 |
| 2007/0268310 A1* | 11/2007 | Dolph | G06T 17/05 345/629 |
| 2008/0092040 A1* | 4/2008 | Nakamura | H04N 1/00222 715/273 |
| 2010/0029340 A1* | 2/2010 | Klassen | G06F 16/9577 455/566 |
| 2010/0107101 A1* | 4/2010 | Shaw | G06F 3/0481 715/766 |
| 2010/0115398 A1* | 5/2010 | Yi | G06F 3/0488 715/234 |
| 2010/0173678 A1* | 7/2010 | Kim | H04N 5/23216 455/566 |
| 2010/0262904 A1* | 10/2010 | Chou | G06F 17/30905 715/240 |
| 2011/0035274 A1 | 2/2011 | Goel et al. | |
| 2011/0314372 A1 | 12/2011 | Teevan et al. | |
| 2011/0320938 A1 | 12/2011 | Schorsch | |
| 2012/0044267 A1 | 2/2012 | Fino | |
| 2012/0084663 A1* | 4/2012 | Momchilov | G06F 3/0481 715/744 |
| 2012/0105484 A1 | 5/2012 | Cui | |
| 2012/0174029 A1* | 7/2012 | Bastide | G06F 3/0488 715/800 |
| 2012/0182237 A1* | 7/2012 | Yun | G06F 3/04842 345/173 |
| 2013/0067390 A1 | 3/2013 | Kwiatkowski et al. | |
| 2013/0104029 A1 | 4/2013 | Hendry et al. | |
| 2013/0111332 A1* | 5/2013 | Davis | G06F 3/0488 715/247 |
| 2013/0147794 A1* | 6/2013 | Lee | G06F 3/04815 345/419 |
| 2013/0174033 A1 | 7/2013 | Hanukaev et al. | |
| 2013/0198641 A1* | 8/2013 | Brownlow | G06F 3/0485 715/738 |
| 2013/0219263 A1* | 8/2013 | Abrahami | G06F 17/211 715/234 |
| 2013/0254640 A1* | 9/2013 | Hadley | G06F 17/30943 715/202 |
| 2014/0040721 A1* | 2/2014 | Brownlow | G06F 17/24 715/234 |
| 2014/0143652 A1* | 5/2014 | DeLoach | G06F 17/212 715/234 |
| 2014/0225928 A1* | 8/2014 | Konnola | G06F 17/30899 345/636 |
| 2014/0281977 A1* | 9/2014 | Schupak | G06F 3/04817 715/716 |
| 2015/0161819 A1* | 6/2015 | Chen | G06T 17/05 345/426 |
| 2015/0169506 A1 | 6/2015 | Leventhal et al. | |
| 2015/0169513 A1 | 6/2015 | Leventhal | |
| 2015/0169520 A1 | 6/2015 | Leventhal et al. | |

OTHER PUBLICATIONS

International Search Report and Written Opinion dated Apr. 15, 2015 for Application No. PCT/US2014/070160.

Supplementary European Search Report and European Search Opinion dated Jul. 19, 2017 for corresponding European patent application No. 14869179.3.

* cited by examiner

TECHNIQUES FOR PROGRAMMATIC MAGNIFICATION OF VISIBLE CONTENT ELEMENTS OF MARKUP LANGUAGE DOCUMENTS

RELATED APPLICATIONS

This application claims priority under 35 U.S.C. § 119(e) to U.S. Provisional Application Ser. No. 61/916,014, titled "Techniques for Programmatic Magnification of Web Content," filed on Dec. 13, 2013, which is herein incorporated by reference in its entirety.

BACKGROUND

Markup languages include markup elements that may serve to identify or describe content, including that describe how visible content is to be rendered for display. A markup language document may include markup elements describing a content and/or formatting of content of the document. Web pages are an example of markup language documents. A web page may be implemented as a set of one or more markup language documents, each of which may include content described using Hypertext Markup Language (HTML) elements or Cascading Style Sheet (CSS) elements, and/or elements of other markup languages. The markup elements of a web page may identify text content, image content, scripting language content, or other forms of content and may, for visible content elements, identify a manner in which the visible content elements are to be rendered. For example, the markup elements may identify a size or placement of visible content elements such as an image, or may describe a formatting of visible content elements such as text. A web browser may, upon download of a web page, review the markup elements of one or more markup language documents and render the visible content elements of the web page on a display based on the markup elements.

SUMMARY

In one embodiment, there is provided a method comprising editing at least one markup element of at least one markup language document and determining an effect of the editing on a display of the at least one markup language document. The determining comprises determining whether any visible content elements of the at least one markup language document are at least partially obscured in the display of the at least one markup language document and, in response to determining that one or more of the visible content elements are at least partially obscured, determining an obscured display area that is obscured for each of the one or more visible content elements that are at least partially obscured and producing an indication of whether a display of the at least one markup language document is obscured based at least in part on the obscured display areas for each of the one or more visible content elements.

In another embodiment, there is provided at least one computer-readable storage medium having encoded thereon executable instructions that, when executed by at least one processor, cause the at least one processor to carry out a method comprising editing at least one markup element of at least one markup language document and determining an effect of the editing on a display of the at least one markup language document. The determining comprises determining whether any visible content elements of the at least one markup language document are at least partially obscured in the display of the at least one markup language document and, in response to determining that one or more of the visible content elements are at least partially obscured, determining an obscured display area that is obscured for each of the one or more visible content elements that are at least partially obscured and producing an indication of whether a display of the at least one markup language document is obscured based at least in part on the obscured display areas for each of the one or more visible content elements.

In a further embodiment, there is provided an apparatus comprising at least one processor and at least one computer-readable storage medium having encoded thereon executable instructions that, when executed by the at least one processor, cause the at least one processor to carry out a method. The method comprises editing at least one markup element of at least one markup language document and determining an effect of the editing on a display of the at least one markup language document. The determining comprises determining whether any visible content elements of the at least one markup language document are at least partially obscured in the display of the at least one markup language document and, in response to determining that one or more of the visible content elements are at least partially obscured, determining an obscured display area that is obscured for each of the one or more visible content elements that are at least partially obscured and producing an indication of whether a display of the at least one markup language document is obscured based at least in part on the obscured display areas for each of the one or more visible content elements.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
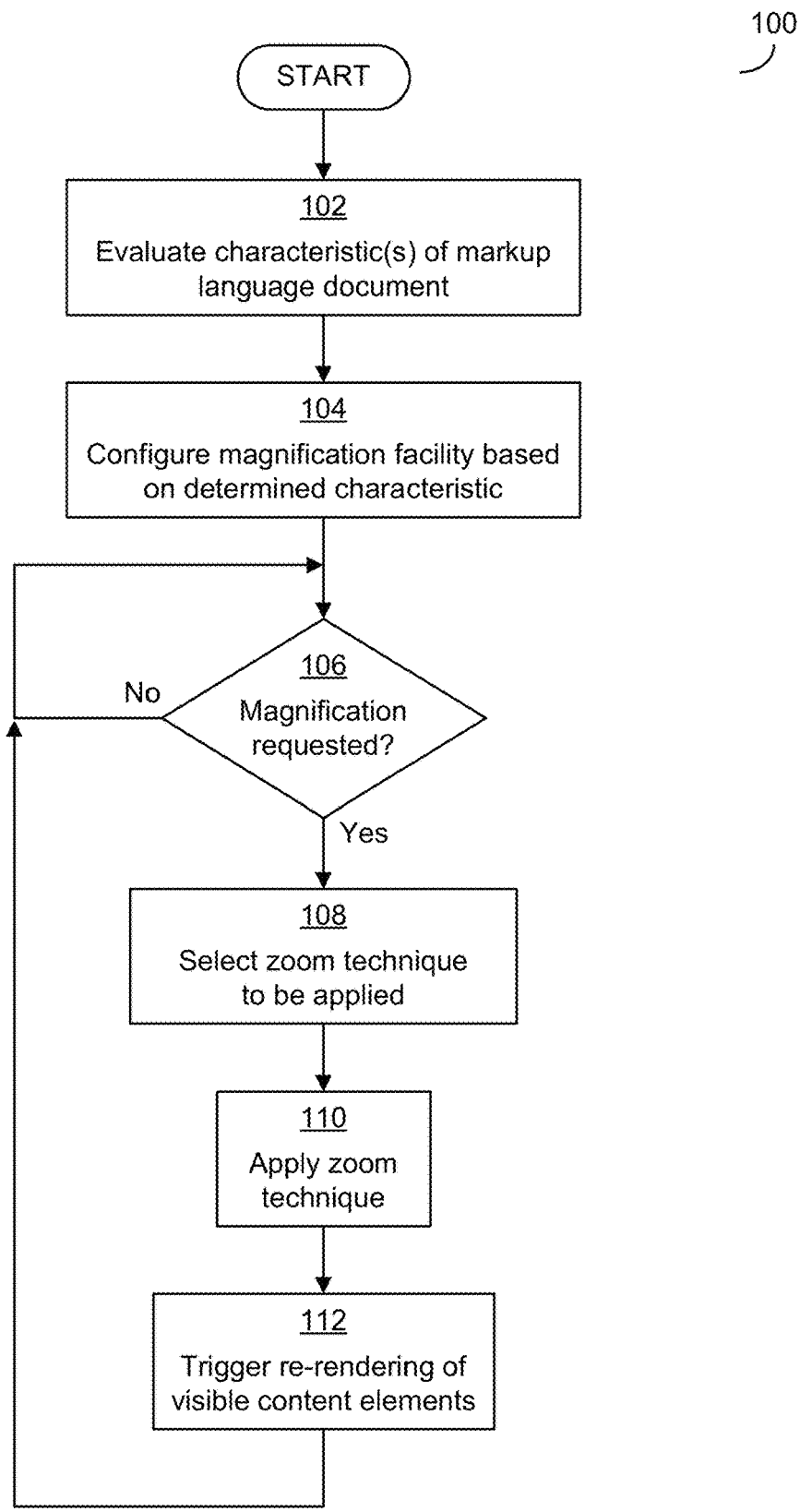
FIG. 1 is a flowchart of an illustrative technique that may be implemented by a magnification facility to increase a display size of visible content elements of one or more markup language documents.

Embodiments described herein relate to techniques for programmatically magnifying one or more visible content elements of at least one markup language document, so as to increase the display size of those visible content elements. In embodiments, a magnification facility may be configured to apply multiple different zoom techniques, where each zoom technique may be a different manner of modifying the executable instructions and/or digital data of the markup language document(s), as defined by the markup elements of the document(s), to increase or decrease a display size of computer data. The magnification facility may be configured to evaluate the markup language document(s) at a time that the document(s) are being processed for display to select which of the multiple different zoom techniques may be applied at a time to increase a display size of visible content elements relative to a default display size for those elements. In some embodiments, the magnification facility may be incorporated within the markup language document(s) and executed by a viewing application that processes markup language documents. For example, the markup language document(s) may form a web page and the magnification facility may be implemented as scripting language code incorporated into the document(s) of the web page that is executed by a web browser that is displaying the web page.

Magnification of web content has traditionally been carried out using built-in magnification functionality of a web browser. Such functionality may be triggered, for example, using a combination of keyboard keys such as Control-"+" in many web browsers, or using a two-finger spreading motion on a touchscreen. The functionality may simply create a graphic of the web page and expand all content graphically, or may expand content elements differently such as by increasing the text size or graphically expanding sizes of images.

As an alternative to such web browser functionality, some operating systems and some third-party software offer the ability to magnify some content shown on a display screen, such as through a "magnifying glass" type interface that allows for displaying an enlarged image of what is displayed in the area surrounding a cursor of a pointing device (e.g., a cursor of a mouse or touchpad).

The inventors have recognized and appreciated that traditional techniques for magnifying web content are inadequate for some users of computing devices. Some users require assistance with using computer interfaces, such as because of their unfamiliarity with the operations of computers or because of disabilities or difficulties of those users. For example, a person who has poor eyesight and is unfamiliar with the operations of computers may have difficulty using the traditional techniques discussed above, such as an elderly person who may be unaware the functionality exists or who may have difficulty using two fingers to hit the keyboard keys or use the touchscreen gesture to trigger the web browser magnification functionality discussed above. Moreover, in some cases the built-in web browser functionality for magnifying web content may make that web content difficult to read and understand. For example, using the built-in web browser magnification, as the content is magnified either a relationship between the content may be maintained and the content may soon extend off screen and not be visible, impacting readability absent inconvenient panning of content, or relationships between content may not be maintained and the content may be magnified in a way that makes the web content illegible, such as by having overlapping content or text that is displayed in columns that are too narrow to comfortably read.

In some such cases, the operating system or third-party magnification functionality may be easier to use and more intuitive. However, the inventors have recognized and appreciated that triggering such functionality, and subsequently disabling that functionality when it is no longer necessary to move the content, may be a complex operation that is beyond the capabilities of some users or, at best, inconvenient for users. Further, many users who would benefit from the operating system or third-party functionality are unaware that the functionality exists. A recent study found that only five percent of vision-impaired computer users were aware of and used magnification functionality.

As a result, both the most common approach using built-in web browser functionality and the more intuitive approach of operating systems and third-party functionality may be inadequate for some users.

The inventors have recognized and appreciated that it may be most intuitive to some users for magnification functionality that is built into the web page, such that the users can use an interface that is set forth within the web page that they are viewing to magnify the content of the web page and not have to use another, separate interface. For markup language documents like web pages, a viewing application like a web browser is typically responsible for handling display of content and moving content within a display area. Markup language documents support the incorporation of executable instructions, such as scripting language code, into the markup language document. These instructions may be executed by the viewing application during rendering and display of the markup language document. The inventors have recognized and appreciated that such scripting language code might be used for magnification. However, the inventors have also recognized and appreciated that traditional magnification techniques cannot be triggered programmatically by such scripting language code. As the traditional magnification techniques described above may not be triggered or implemented by scripting language code, the inventors appreciated that new techniques would need to be developed.

Accordingly, described herein are zoom techniques, not previously used, for programmatically magnifying visible content elements of one or more markup language documents. Some of the zoom techniques described herein may be used not only to enlarge content of markup language documents, but to enlarge the content in a manner that preserves readability of the content or mitigates a loss of readability that may result from magnification. Some techniques described herein may magnify visible content elements of markup language documents by modifying the markup elements of the markup language documents. For example, HTML or CSS markup elements of a web page may be modified using techniques described herein to magnify web content. As an example of one of the zoom techniques described herein, a magnification facility incorporated into a markup language document may, in response to user input requesting increase in display size, edit one or more markup elements of a web page, such as by inserting new elements and/or modifying existing elements. Specifically, the magnification facility may edit the markup elements to narrow a width of a display area (e.g., a viewport of a web browser) for the web page, such as by specifying that only a portion of the display area may be used for display of content of the markup language document. Following narrowing of the width, the magnification facility may further edit the markup elements to scale up a size of visible content elements of the web page. By editing the markup elements to narrow the content area and subsequently enlarge the visible content elements, an original layout of a web page may be preserved and a readability of the web page may be preserved. As another example, a magnification facility may edit the markup elements to scale up a size of the visible content elements of the web page and to shift a position of the visible content elements in a direction (e.g., shift rightward). Again, in web pages for which this technique is used, the editing of the markup elements to scale and shift may preserve readability of the web page.

Some of the zoom techniques described herein may be used to magnify only a portion of the visible content elements of a web page or other markup language document, as opposed to an entirety of the visible content elements. In addition, some of the zoom techniques described herein may be useful for increasing a display size of a cursor of a pointing device (e.g., a mouse cursor) along with or separately from an increase in display size of content of a markup language document.

Also described herein are techniques for evaluating a web page prior to and during magnification to select between zoom techniques that may be applied at a given time to increase a display size of visible content elements, such as by evaluating to determine whether criteria are met and selecting zoom techniques in accordance with those criteria.

More particularly, some embodiments may evaluate criteria relating to an effect that application of a particular zoom technique has had or would have on a markup language document. For example, embodiments may evaluate whether application of a particular zoom technique has or would have a negative impact on readability of visible content of a markup language document, such as more than a threshold impact on readability. Readability of the markup language document may be evaluated in any of various ways, including by whether visible content has been obscured as a result of the magnification. For example, a magnification facility may, in some embodiments, select between two zoom techniques that could be applied at a time by determining whether at least one of them would lead to display of the markup language document in which more than a threshold amount of the visible content is obscured.

Also described herein are techniques that may evaluate properties of a markup language document to select between zoom techniques for magnifying visible content elements based on the properties of the markup language document. In such embodiments, through evaluating the properties a magnification facility incorporated into a markup language document may tailor a type of magnification performed for that markup language document based on the properties of that markup language document.

For ease of description below, many of the examples will be given in the context of a single markup language document that is processed by a viewing application and for which visible content elements are displayed in a display area of the viewing application. It should be appreciated, however, that multiple markup language documents may be associated with one another and together describe visible content elements to be displayed in a display area of a viewing application, such that the viewing application may process the markup language documents together to display the visible content elements. As a specific example, a web page may be described by multiple markup documents, which may include one or more HTML documents and one or more CSS documents, among other markup documents or other files referenced by the markup language documents. The multiple documents of the web page may refer to one another or one (or more) of the documents may refer to the other documents. Accordingly, it should be appreciated that embodiments are not limited to evaluating one markup language document and any of the techniques described below (unless indicated otherwise) may be applied to multiple markup language documents, such as documents that are associated and together describe a set of visible content elements to be displayed in a display area of a viewing application.

Further, for the sake of brevity, the discussion below will focus on increasing a display size of visible content elements. Those of skill in the art will appreciate that a decreasing of the display size of visible content elements may also be performed using the same techniques.

FIG. 1 is a flowchart of an exemplary process that may be implemented by a magnification facility in some embodiments. The magnification facility may be implemented in any suitable manner, as embodiments are not limited in this respect. In some embodiments, the magnification facility may be implemented as scripting language code that is incorporated into one or more markup language documents, including by being disposed within a markup language document or being disposed in a separate file and being referenced by the markup language document. In some such embodiments, the magnification facility may be implemented as JavaScript code, though other scripting languages may be used.

Prior to the start of the process 100 of FIG. 1, a viewing application may download the markup language document into which the magnification facility is incorporated. For example, the viewing application may download the markup language document in response to a user request to perform the download, such as by downloading the document in response to the user inputting a Universal Resource Locator (URL) that refers to a web page. Upon download, the viewing application may begin processing the markup language documents. The processing performed by the viewing application may be any suitable processing, including known processing of markup language documents to display visible content elements described and/or identified by the markup elements of the markup language document. As a part of the processing, the viewing application may execute scripting language code incorporated into the markup language document and may execute the magnification facility. The viewing application may execute the magnification facility in any suitable manner, including using known techniques, such as known techniques that a viewing facility (e.g., a web browser) may use for interpreting and executing scripting language code.

The process 100 begins in block 102, in which the magnification facility evaluates one or more characteristics of the markup language document. The magnification facility may evaluate any suitable characteristics, as embodiments are not limited in this respect. The characteristics that are evaluated in block 102 may be characteristics that the magnification facility may use to determine which of various zoom techniques to apply in magnifying content in response to user request. The characteristics may be characteristics that affect a display of visible content elements and, as such, may impact a display as the visible content elements are enlarged. The characteristics may, for example, relate to a layout or position of visible content elements. Examples of characteristics that may be evaluated by the magnification facility in block 102 are described below, including in connection with FIGS. 2 and 3B.

In block 104, the magnification facility configures itself based on the characteristic(s) determined in block 102. The magnification facility may configure itself in any suitable manner in block 104, including by storing information, e.g., by setting variable values, that will be used by the magnification facility to select between different zoom techniques to apply in increasing a display size of visible content elements of the markup language document. For example, in block 104, the magnification facility may determine whether one or more criteria are met by the characteristics determined in block 102 and then configure itself to use different zoom techniques based on whether the criteria are or are not met.

In block 106, the magnification facility determines whether user input has been received that requests an increase in the display size of visible content elements of the markup language document. Any suitable user input may be used, as embodiments are not limited in this respect. In some embodiments, the user input may be provided via a keyboard key or one or more graphics integrated into the markup language document and displayed in the display area of the viewing application along with visible content elements of the markup language document. In the case that graphics are used, the graphics may be any suitable graphics, such as a button or a slider.

If the facility determines in block 106 that such user input has not been received, then the magnification facility loops back and continues waiting for the user input.

If, however, the magnification facility determines in block 106 that the user input has been received, then in block 108 the magnification facility selects a zoom technique to apply based on the configuration of block 104. As should be appreciated from the foregoing, the magnification facility may be configured to apply multiple different zoom techniques, each of which may be a different manner of modifying the executable instructions and/or digital data of the markup language document, as defined by the markup elements of the document, to increase or decrease a display size of computer data (the visible content elements). In accordance with techniques described herein and the determinations of the magnification facility, the magnification facility may select one of the zoom techniques to apply at a time. In some embodiments, the magnification facility may select the zoom technique that may best preserve readability of the visible content elements or best preserve a layout of the visible content elements, or have a least amount of obscuring of the visible content elements following magnification. The selection of block 108 may be an explicit selection or may include triggering application of a zoom technique that was previously selected as part of the configuration of block 104.

Once the zoom technique is selected in block 108, the magnification facility applies the selected zoom technique in block 110. Examples of zoom techniques are discussed in more detail below. In some embodiments, the magnification facility may, in block 110, edit the markup elements of the markup language document. Editing the markup elements may include any suitable editing, including modifying existing markup elements, inserting new markup elements, and/or removing markup elements.

In some embodiments, the magnification facility may also, following application of the zoom technique, trigger the viewing application to re-render the visible content elements of the markup language document in accordance with the zoom technique, which results in visible content elements being displayed in the display area of the viewing application with an increased size relative to a default size of the visible content elements. Once the re-rendering is triggered, the magnification facility returns to block 106 to monitor for further user input requesting further magnification.

Various functionality of the example of FIG. 1 is generic to multiple different embodiments described herein and may be implemented in various specific ways. Specific ways of implementing the functionality of FIG. 1 are described below in connection with FIGS. 2-8.

Figure 2:
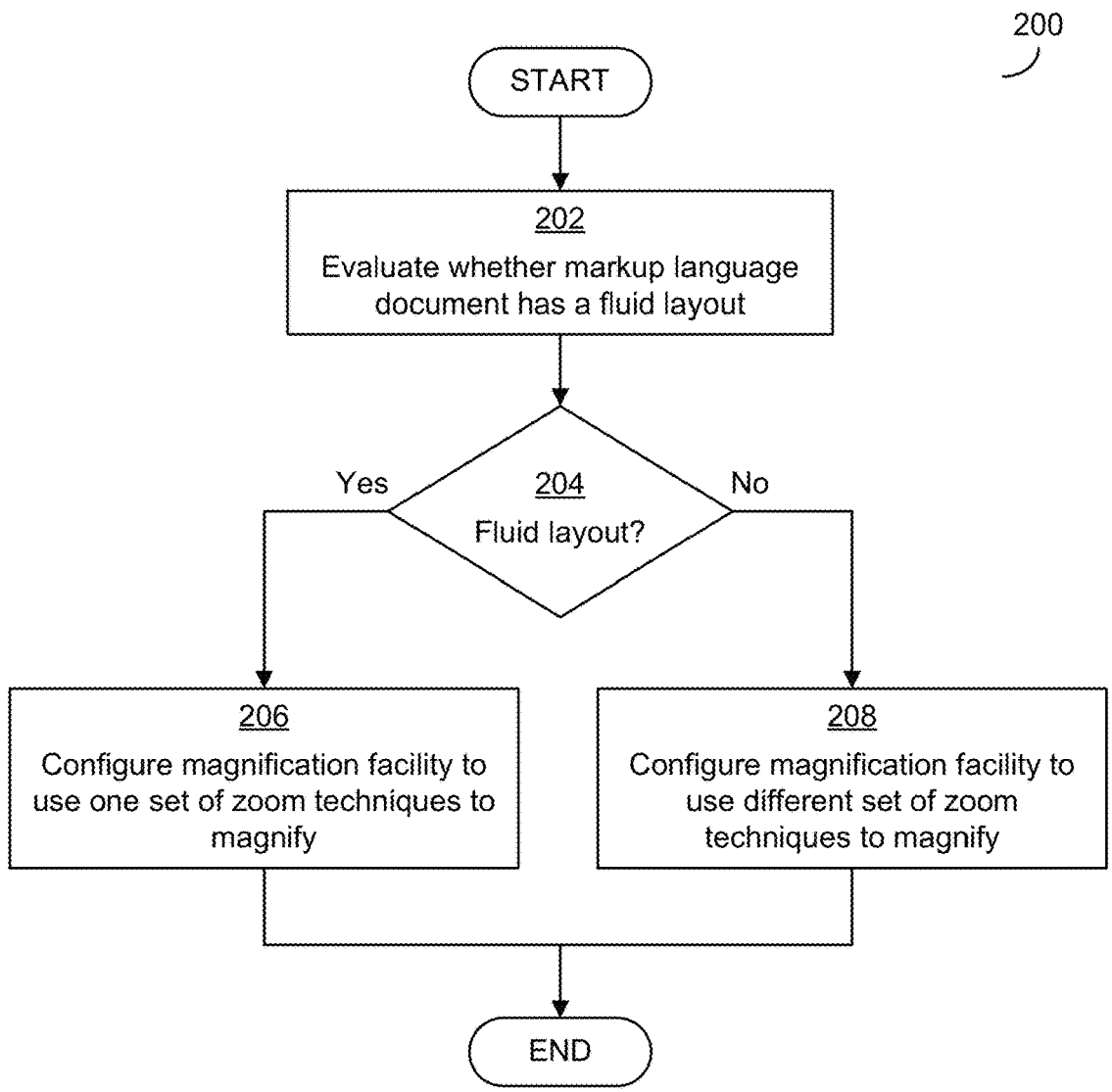
FIG. 2 is a flowchart of an illustrative technique for configuring a magnification facility to use different zoom techniques based on characteristics of a markup language document.

FIG. 2 illustrates an example of a process that may be implemented by a magnification facility to evaluate characteristics of a markup language document and configure itself in response to those characteristics, such as the functionality briefly discussed above in connection with blocks 102 and 104 of FIG. 1. The process 200, as with the process 100 of FIG. 1, may be performed by a magnification facility when triggered by a viewing application that has downloaded and processed a markup language document into which the magnification facility is incorporated. The process 200 may be started and completed prior to visible content elements of the markup language document being displayed to a user and prior to receiving user input requesting increase in a display size of visible content elements. In other embodiments, however, performing the process 200 (and/or other examples of processes discussed below) at download time and prior to display of visible content elements may unacceptably delay the display of the visible content elements. In some such embodiments, the process 200 (and/or other examples of processes discussed below) may be performed in response to a user signaling that they may use the magnification facility, such as by indicating that they may request increase of display size. The user may signal this by positioning a cursor of a pointing device over a user interface element by which the request for increased display size may be made, such as over a button or slider or over a frame or other portion of a markup language document that contains such a button or slider. In still other embodiments, the process 200 (and/or other examples of processes discussed below) may be performed by the magnification facility in response to user input requesting increase in display size, such as in response to a first user input requesting increase in display size.

The process 200 of FIG. 2 begins in block 202, in which the magnification facility evaluates the markup language document to determine whether the markup language document has a fluid layout. In a fluid layout, visible content elements may be resized and rearranged in a display area (e.g., a viewport) based on a width of the display area, such as by being resized or rearranged between display screens of different sizes. An alternative to a fluid layout is a fixed layout, in which visible content elements have fixed positions and layouts that do not change between display areas.

In embodiments that determine in block 202 whether the markup language document has a fluid layout, the magnification facility may determine whether the markup language document has a fluid layout in any suitable manner.

For example, the magnification facility may edit the markup language document to determine whether display of the visible content elements is adjusted in response to the edit in a manner that suggests the markup language document has a fluid layout. For example, the magnification facility may select one or more visible content elements described by the markup language document and determine a default dimension, such as a position or measurement like width, of the selected visible content element that would be present if the markup language document were displayed in a display area of the viewing application without edits. The magnification facility may determine such a dimension using known functionality of scripting language documents, such as by querying an object (corresponding to the selected visible content element) for its "width" attribute. Then, the magnification facility may edit the markup language document, such as by inserting a new markup element specifying a change in a display area of the markup language document. For example, the magnification facility may insert a markup element narrowing the display area (e.g., narrowing an area of the viewport that is available for displaying content of the markup language document). The magnification facility may then trigger a re-processing (which may be a re-rendering) of the visible content elements of the markup language document. If the markup language document includes a fluid layout, dimensions of the selected visible content elements should change as a result of the re-processing, to take into account the narrowed display area or other change to the markup language document. Accordingly, the magnification facility again determines the same dimension of the selected visible content element and compares the new dimension to the default dimension. If the two dimensions are the same, the magnification facility determines that the markup language document does not have a fluid layout. If, however, the two dimensions are different, the magnification facility determines that the markup language document has a fluid layout.

In block 204, the magnification facility determines, as a result of the evaluation of block 202, whether the markup language document has a fluid layout. If so, then in block 206 the magnification facility configures itself (e.g., by storing information, such as setting values of one or more variables) to use one set of zoom techniques to magnify visible content elements of the markup language document. The one set that is configured to be used may be zoom techniques that may magnify visible content elements in a way that may take advantage of the fluid layout and preserve readability and/or layout of the visible content elements. The one set of zoom techniques may include any suitable number of zoom techniques, including a pair of zoom techniques that, as discussed below, may include a first zoom technique that is used until a condition is met and a second zoom technique that is to be used after the condition is met. For example, the first zoom technique may be used until a certain level of magnification is reached, after which the second zoom technique is used if the user requests further magnification.

If, however, the magnification facility determines in block 204 that the markup language document does not have a fluid layout, then in block 208 the magnification facility configures itself (e.g., by storing information, such as setting values of one or more variables) to use another set of zoom techniques, different from the set of block 206, to magnify visible content elements of the markup language document. The other set that is configured to be used may be zoom techniques that may magnify visible content elements in a way that may preserve readability and/or layout of the visible content elements in the absence of a fluid layout. The other set of zoom techniques may include any suitable number of zoom techniques, including a pair of zoom techniques that, as discussed below, may include a third zoom technique that is used until a condition is met and a fourth zoom technique that is to be used after the condition is met. For example, the third zoom technique may be used until a certain level of magnification is reached, after which the fourth zoom technique is used if the user requests further magnification.

After the configuration of either block 206 or 208, the process 200 ends.

As should be appreciated from the foregoing, including the discussion of the configurations of block 206 and 208, a magnification facility may be configured with multiple different zoom techniques and may vary over time, as user input is received requesting magnification and additional magnification, which zoom technique is applied to increase the display size of visible content elements. The magnification facility may vary the zoom techniques in any suitable manner, and may select between the zoom techniques based on any suitable condition or criterion. In some embodiments, the magnification facility may use one zoom technique to increase a display size of visible content elements until a criterion is met, after which (if the user requests additional magnification) another zoom technique is used to increase the display size. In some embodiments, the criterion on which the magnification facility selects between zoom techniques may relate to a magnification of visible content elements. Examples of such criterion are described in connection with FIGS. 3A-3C.

Figure 3A:
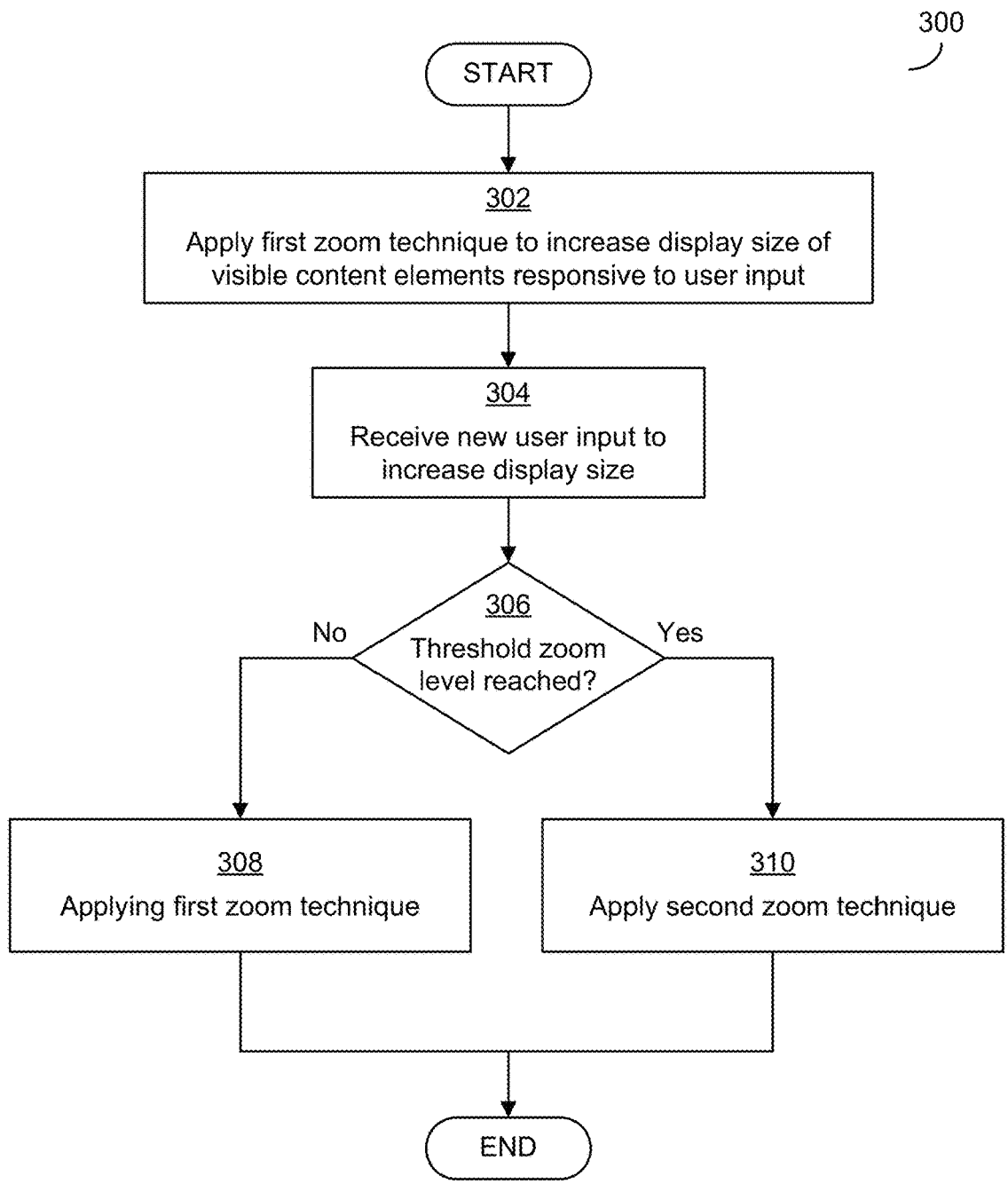
FIGS. 3A-3C are flowcharts of exemplary techniques that may be implemented by a magnification facility for selecting between zoom techniques based on satisfaction of a criterion.

In the example of FIG. 3A, prior to the start of the illustrated process a markup language document is downloaded and processed, and visible content elements described by the markup language document are displayed in a display area of the user interface of the viewing application. A magnification facility may be incorporated into the markup language document and may be executed by the viewing application as part of processing the markup language document. The magnification facility may implement the illustrated processes.

The process 300 begins in block 302, in which the magnification facility responds to one or more user inputs requesting increase of a display size of visible content elements of the markup language document by applying a first zoom technique. Any suitable zoom technique may be used in block 302, examples of which are described in detail below. The first zoom technique may be, in some embodiments, a first zoom technique of a set of zoom techniques selected as part of a configuration of the magnification facility, such as the configuration discussed above in connection with FIG. 2.

The application of the zoom technique in block 302 may increase a zoom level of the markup language document by some amount, such as by 10 percent, such that one or more of the visible markup elements of the markup language document are displayed at a size 10 percent larger than before. If the application of the zoom technique in block 302 is the first application of any zoom technique, the visible content elements may be displayed 10 percent larger than a default display size. If the display size had previously been increased, however, the cumulative zoom level resulting from the user input may be higher, such as 125 percent (25 percent larger), 150 percent, etc.

In block 304, the magnification facility receives new user input to increase the display size again. In response, in block 306, the magnification facility determines whether a threshold zoom level has been reached. The magnification facility may compare the cumulative zoom level thus far (which may be 110 percent, 125 percent, etc. as discussed above), or the cumulative zoom level that would result from increasing the zoom level again, to a threshold to determine whether the zoom level exceeds the threshold. If not, then in accordance with its configuration, the magnification facility is to continue to apply the first zoom technique. Accordingly, in block 308, the magnification facility applies the first zoom technique and the process 300 ends. If, however, the magnification facility determines in block 306 that the cumulative zoom level meets or exceeds the threshold zoom level, then in accordance with its configuration the magnification facility is to switch to applying a second zoom technique, different from the first zoom technique. The second zoom technique may be, in some embodiments, a second zoom technique of a set of zoom techniques selected as part of a configuration of the magnification facility, such as the configuration discussed above in connection with FIG. 2.

Accordingly, in block 310 (and potentially in subsequent steps, if the user continues requesting increase in the display size), the magnification facility applies the second zoom technique. Once a zoom technique is applied in blocks 308 or 310, the process 300 ends.

In some embodiments, in addition to applying the second zoom technique in block 310, the magnification facility may store data indicating that the second zoom technique should be used in response to future requests from a user to increase display size, such that the determination of block 306 can be avoided in future magnifications.

While in the example of FIG. 3A, and in other examples below, the zoom technique is described as being applied responsive to user input, it should be appreciated that embodiments are not so limited. In some embodiments, a zoom technique may be applied in response to detecting a setting that specifies a level of zoom to be applied that has been set by a user, a viewing application, or a markup language document, or set in any other suitable manner. The setting may be detected at any suitable time, including after a markup language document has been displayed or at another time.

In some embodiments, the threshold zoom level that the magnification facility evaluates in block 306 may be a static zoom level with which the magnification facility is preconfigured before download by the viewing application, such as a threshold zoom level that is hardcoded into the magnification facility. For example, the threshold zoom level may be 1.5 or 150 percent.

Figure 3B:
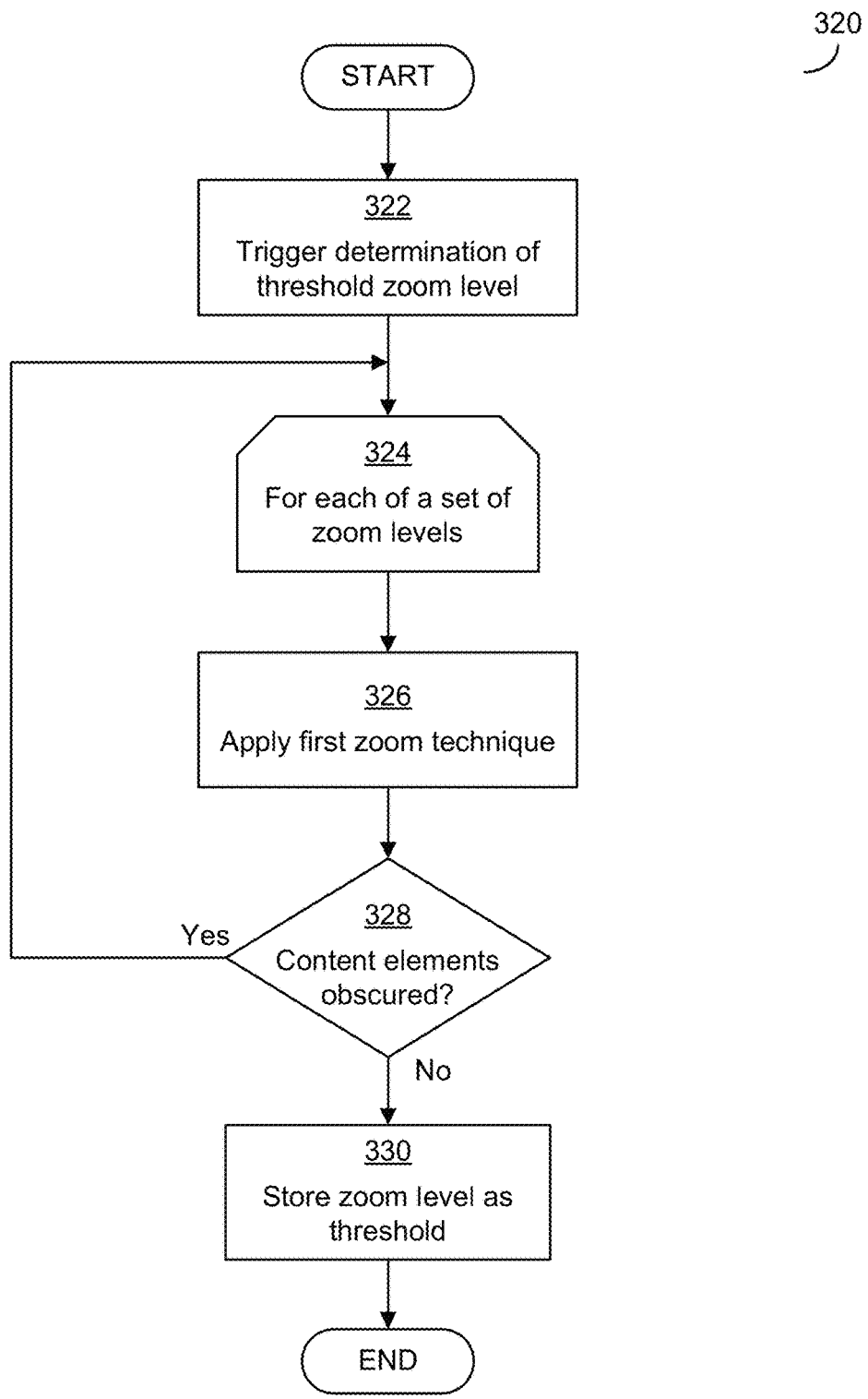

In other embodiments, however, the magnification facility may determine the threshold zoom level through evaluating the markup language document. In these embodiments, the magnification facility may evaluate the markup language document in any suitable manner, as embodiments are not limited in this respect. FIG. 3B illustrates an example of an evaluation that may be performed by the magnification facility in some embodiments.

The process 320 of FIG. 3B may be performed by a magnification facility upon execution and, in some embodiments, prior to display of visible content elements of a markup language document in a display area of a markup language document and prior to receipt of user input requesting increase in display size. Through the process 320 of FIG. 3B, the magnification facility may edit the markup language document repeatedly to identify a threshold zoom level at which the magnification facility is to switch between zoom levels. The editing may be performed during a time following download of the markup language document and prior to display of the visible content elements. By determining the threshold zoom level at this time, it may be more efficient to subsequently switch between zoom techniques without an impact or with limited impact on user experience, such as by limiting a time that the user waits while magnification is applied.

In the example of FIG. 3B, the magnification facility determines the threshold zoom level through determining a zoom level at which visible content elements begin to be obscured when the first zoom technique is applied. It should be appreciated, however, that embodiments are not limited to determining the threshold zoom level in this manner and that other evaluations may be used.

The process 320 begins in block 322 in which the magnification facility triggers determination of the threshold zoom level. In block 324, the magnification facility begins magnifying the visible content elements of the markup language document to one or more of multiple different zoom levels of a set of zoom levels. The zoom levels may be any suitable zoom levels, as embodiments are not limited in this respect. In some embodiments, the zoom levels of the set may be zoom levels that increase linearly and the magnification facility may consider each in a sequence until the threshold zoom level at which visible content element begin to be obscured.

Accordingly, a loop is started in block 324 that evaluates one or more zoom levels. For each zoom level, the magnification facility in block 326 applies a first zoom technique to increase display size of the visible content elements to the selected zoom level. The first zoom technique may be any suitable zoom technique, such as a first zoom technique of a set of zoom techniques selected as part of a configuration of the magnification facility, such as the configuration discussed above in connection with FIG. 2.

After the zoom technique is applied, which may include editing markup elements of the markup language document and re-rendering the markup language document, the magnification facility determines in block 328 whether a criterion is met regarding one or more visible content elements being obscured. The evaluation of whether visible content elements are obscured, or whether a criterion relating to obscuring of content is met, may be carried out in any suitable manner, an example of which is described below in connection with FIG. 4. In some embodiments, in block 328 rather than merely determining whether visible content elements are obscured, the magnification facility may determine whether an area of the visible content elements that is obscured meets or exceeds a threshold for obscured area, or whether a ratio of a total obscured area for content elements to the total content area of the visible content elements meets or exceeds a threshold.

If the magnification facility determines in block 328 that the criterion related to obscuring of visible content elements is not met, the magnification facility returns to block 324 and another zoom level is evaluated. If, however, the facility determines in block 328 that the criterion is met, then in block 330 the most-recently-used zoom level of the loop of block 324 is stored in block 330 as the threshold zoom level, indicating that zoom levels that meet or exceed that threshold should use a different zoom technique than the first zoom technique. After the zoom level is stored, which may be stored as part of configuring the magnification facility, the process 320 ends.

In some embodiments, rather than storing the most-recently-used zoom level of the loop of block 324, the facility may use a zoom level that is lower than that zoom level, such as a zoom level that is some amount less than the most-recently-used zoom level or a zoom level that was evaluated in the loop of block 324 in an iteration immediately before the most-recently-used zoom level.

In the example of FIG. 3B, for ease of description and understanding, a relatively simple example was used in which a set of zoom levels are sequentially examined. Those of skill in the art will appreciate, however, that such a linear analysis may be inefficient. In other embodiments, the zoom levels of the set evaluated in the loop of block 324 may be a set of different zoom levels that may be evaluated through a binary search or other search mechanism to attempt to quickly identify (e.g., more quickly than through a linear search) a zoom level at which visible content elements begin to be obscured.

The example of FIG. 3B described evaluating zoom levels prior to display of visible content elements, or prior to receipt of user input requesting increase in display size of visible content elements. Embodiments are not so limited, however. In some embodiments, as in the example of FIG. 3C, a magnification facility may evaluate in response to user input whether continued application of a zoom technique would result in a condition relating to obscuring of visible contents being met.

Figure 3C:
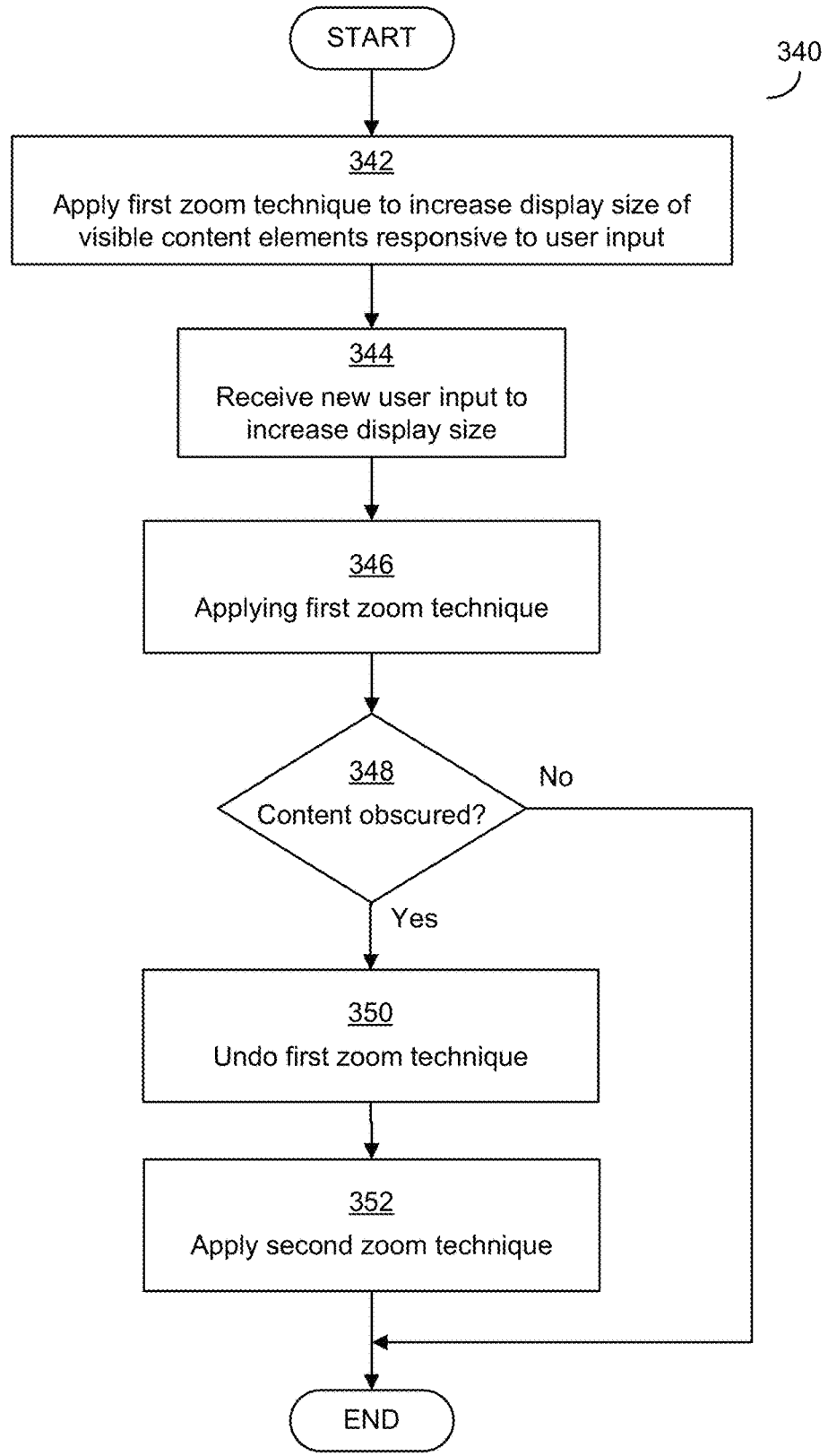

In the example of FIG. 3C, prior to the start of the illustrated process a markup language document is downloaded and processed, and visible content elements described by the markup language document are displayed in a display area of the user interface of the viewing application. A magnification facility may be incorporated into the markup language document and may be executed by the viewing application as part of processing the markup language document. The magnification facility may implement the illustrated processes.

The process 340 begins in block 342, in which the magnification facility responds to one or more user inputs requesting increase of a display size of visible content elements of the markup language document by applying a first zoom technique. Any suitable zoom technique may be used in block 342, examples of which are described in detail below. The first zoom technique may be, in some embodiments, a first zoom technique of a set of zoom techniques selected as part of a configuration of the magnification facility, such as the configuration discussed above in connection with FIG. 2.

The application of the zoom technique in block 342 may increase a zoom level of the markup language document by some amount, such as by 10 percent, such that one or more of the visible markup elements of the markup language document are displayed at a size 10 percent larger than before. If the application of the zoom technique in block 302 is the first application of any zoom technique, the visible content elements may be displayed 10 percent larger than a default display size. If the display size had previously been increased, however, the cumulative zoom level resulting from the user input may be higher, such as 125 percent (25 percent larger), 150 percent, etc.

In block 344, the magnification facility receives new user input to increase the display size again. In response, the magnification facility again applies the first zoom technique in block 346. In block 348, the magnification facility then determines whether a criterion relating to obscuring of the one or more visible content elements is met. The determination of block 348 may be made in any suitable manner, including in accordance with techniques described above in connection with block 328 of FIG. 3B and in accordance with the technique for determining whether content is obscured described below in connection with FIG. 4. If the magnification facility determines that the criterion is not met, then the process 340 ends.

If, however, the facility determines in block 348 that the criterion relating to obscuring of content is met, then in block 350 the magnification facility undoes the first zoom technique that was applied in block 346, which may include modifying or removing markup elements that were modified or inserted in block 346. Then, in block 352, the magnification facility applies a second zoom technique, which may be a second zoom technique from a set with which the magnification facility was configured, such as through the configuration of FIG. 2. Once the second zoom technique is applied, the process 340 ends.

In some embodiments, in addition to applying the second zoom technique in block 352, the magnification facility may store data indicating that the second zoom technique should be used in response to future requests from a user to increase display size, such that the determination of block 348 can be avoided in future magnifications.

The examples of FIGS. 3B and 3C described determining whether a criterion related to obscuring of visible content elements is met, but did not describe any particular technique that may be used for determining whether visible content elements are obscured or partially obscured. In some embodiments, the criterion may relate simply to whether any visible content elements are obscured or partially obscured. In other embodiments, the criterion may relate to the amount of obscuring and a calculation may be made of a total area of visible content elements that is obscured. Examples of such a calculation and manners in which a magnification facility may determine whether a visible content element is obscured are discussed below in connection with FIG. 4.

Those skilled in the art will appreciate that, as the display size of the visible content elements of a markup language document is increased, the visible content elements may become obscured. As discussed above, the inventors have recognized and appreciated that it may be valuable in embodiments the apply zoom techniques that account for preserving readability of a markup language document. Determining when visible content elements have become or may become obscured is one way in which a magnification facility operating in accordance with techniques described herein may account for readability when magnifying web content.

A visible content element may become obscured when it is at least partially not legible, such as by being at least partially not visible or displayed in a manner that makes reading or viewing the content difficult. For example, as an image is enlarged a part of the image may extend beyond a display area of the viewing application and, as part of it is beyond the display area, it may be partially not visible or difficult to view/read. As another example, due to magnification and layout attributes of a markup language document or particular elements, one element may begin overlapping another in the display, leading to the overlapped element to be at least partially not visible or difficult to view/read. As still another example, if a width of a column of text is limited, as the text grows in size the text may "wrap" such that words drop to lines below and the column of text grows longer. Beyond a certain level of magnification, though, that text may have so few words or characters per line that reading the text may be difficult for an average user. In such cases, the elements or text may be identified as at least partially obscured. Those skilled in the art will appreciate that there may be tolerances associated with obscuring, such as a degree to which overlapping may be permitted before an overlapped element is identified as obscured or a number of characters or words per line of text that may be permitted before the text is flagged as difficult to read and the text is identified as obscured. These tolerances may vary between environments or users. The magnification facility may be configured with such tolerances in some embodiments, as discussed below.

Figure 4:
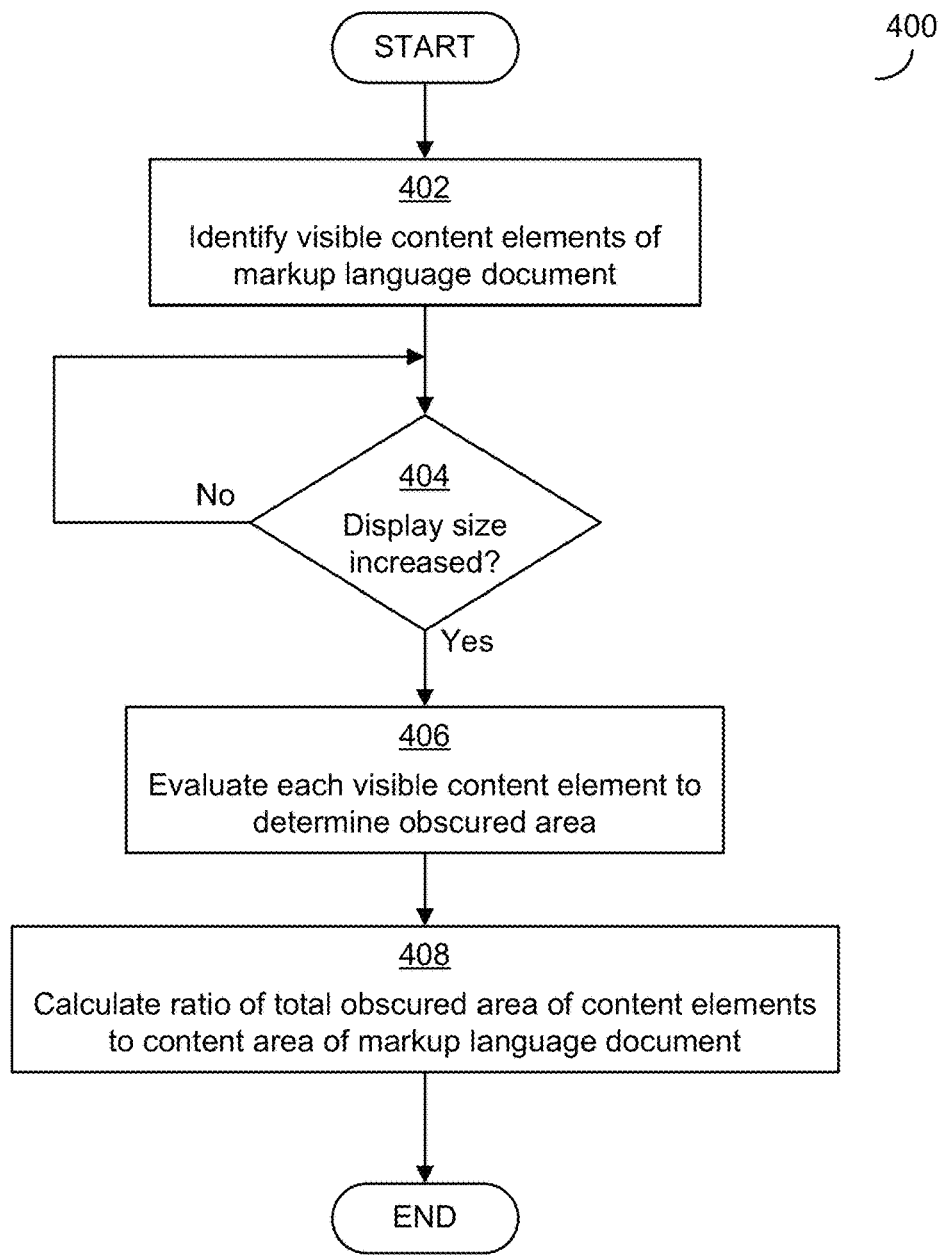
FIG. 4 is a flowchart of an exemplary technique that may be implemented by a magnification facility for determining whether magnification has resulted in visible content elements of one or more markup language documents being at least partially obscured.

The process 400 of FIG. 4 may be implemented by a magnification facility and may be executed at any suitable time or in response to any suitable conditions, such as in the examples of FIGS. 3B and 3C discussed above. The process 400 begins in block 402, in which the magnification facility identifies visible content elements of the markup language document. The magnification facility may identify the visible content elements in any suitable manner, including through accessing information stored by the viewing application on elements described by the markup language document. For example, elements described by a markup language document may be arranged hierarchically, with some elements disposed within other elements (e.g., a text element disposed within a table element, when the text is to be displayed within the table). The viewing application may maintain information on elements of a markup language document in a data structure having a corresponding hierarchy. An example of such a data structure is the Document Object Model (DOM) that is maintained for elements of a web site by a web browser. The magnification facility may evaluate each of the elements identified by the DOM or other hierarchical data structure to identify content elements that would be visible in the display area of the viewing application when the markup language document is displayed, which includes visible elements that are colored differently from a background of the markup language document but not visible elements that are the same color as the background of the markup language document. This evaluation is made because the some elements of the markup language document may not be visible, such as elements that are explicitly flagged as invisible or elements that are, by their nature, merely related to layout or organization of the document and are not visible (e.g., "div" containers). In block 402, the magnification facility may store information on each of the visible content elements, such that each of the visible content elements may be subsequently identified and evaluated quickly to determine if any of the visible content elements is obscured.

In some embodiments, in the interests of efficiency, in block 402 the magnification facility may eliminate some visible content elements from consideration. The magnification facility may, in some such embodiments, eliminate elements that have dimensions less than a threshold. For example, if a block of text has less than a threshold number of characters, such as less than 100 characters, the block of text may not be evaluated. As another example, if an element such as an image has a dimension, such as a width, less than a certain threshold in pixels, the element may not be evaluated. By eliminating some elements from consideration in this manner, the magnification facility may evaluate fewer visible content elements in the remaining acts of the process 400 and thereby speed the process.

In block 404, the magnification facility determines whether a display size of the markup language document has been increased, either in response to user input (as in the example of FIG. 3C) or in response to the magnification facility testing different zoom levels during a configuration phase (as in the example of FIG. 3B). If not, then the magnification facility loops back and continues to wait for the display size to be increased. If, however, in block 404 the magnification facility determines that the display size has been increased, then in block 406 the facility evaluates each of the visible content elements identified in block 402 to determine an obscured area of each element.

As mentioned above, there may be various ways in which a content element may be obscured and, as such, determining whether a content element is obscured may vary for each element. Some other ways of determining whether visible content elements are obscured may apply to all types of content elements, however. For example, the magnification facility may determine, for each of the visible content elements, whether the element extends outside of a display screen, such that the visible content element is wholly or partially disposed outside of the display screen. As another example, the magnification facility may determine, for each of the visible content elements, whether the element is at least partially overlapped by another content element. Overlapping may be determined in any suitable manner, such as by selecting one or more points along the edges or interior of a content element and using the "ElementFromPoint" function to determine whether there are multiple visible content elements disposed at any of those points. If there are multiple content elements, then the content element must be partially overlapped or must be partially overlapping another element. As another example, the magnification facility may examine visible content elements that are arranged together in the hierarchy within the same "container" element of the markup language document (which may not be a visible content element) to determine whether all of those visible content elements are arranged on a same line in the display area. Because visible content elements disposed in a same container may be arranged in a same line, that the visible content elements are not following the magnification suggests that the layout of the markup language document may have been altered by the magnification in a way that has negatively impacted readability and legibility of the document, and suggests content is obscured.

Other ways of identifying whether content elements are obscured may be specific to the type of content element being evaluated. For example, a magnification facility may determine whether text is obscured in part by evaluating a number of characters and/or words per line in the text. For example, the magnification facility may be configured with a minimum number of characters or words for which text is legible and determined not to be obscured. With fewer than that number of characters or words, however, the magnification facility may determine that the text would be difficult for a user to view/read and thus obscured. The magnification facility may determine a number of characters in a line of text in any suitable manner. For example, in some viewing applications the magnification facility may be able to access a number of words or characters per line of a block of text, which may be an average number of words/characters per line over all the lines of the text. As another example, the magnification facility may evaluate a font size of the text and a width in pixels of the block of text, which may be a width of the column of text or a width of a container including the text. The magnification facility may be configured with an average character width in pixels for font sizes and calculate a number of characters included in a line of the text by dividing the width of the block of text by the character width in pixels. If the number of words per line is to be evaluated, the magnification facility may further divide the determined number of characters by an average number of characters per word (e.g., five characters per word), with which the facility may also be configured.

In block 406, the magnification facility may also determine an "obscured area" for each of the visible content elements that is at least partially obscured. In some embodiments, the magnification facility may identify that an obscured area of a visible content element is the area (e.g., in pixels) of the portion of the element that is obscured, such as the portion that extends off screen or is overlapped by another element. As another example, the magnification facility may identify the obscured area of a visible content element as the total area (e.g., in pixels) of that element, even if the element is only partially obscured. For example, for text, once the text is determined to be obscured the entirety of the area of the text may be identified as obscured. As another example, for text, an obscured area of the text may be determined as an area of the text weighted by a degree by which the text is determined to be obscured. For example, as the text is enlarged and becomes more obscured, for example, as the number of characters per line decreases, an obscured area of the text may increase correspondingly until the obscured area equals the total area of the text when the text is identified as obscured. The area of visible content elements may be determined in any suitable manner, including by querying attributes of the elements in the hierarchical data store (e.g., DOM) maintained by the viewing application.

Once the obscured area of each of the visible content elements has been determined in block 406, in block 408 the magnification facility may determine a ratio of the total obscured area of the visible content elements of a content area of the markup language document. The content area of the markup language document, as should be appreciated from the foregoing, is the total area (e.g., in pixels) of a rectangle bounding the area in which all visible content elements are positioned. The content area of a markup language document may be determined in any suitable manner, including according to a technique described below in connection with FIG. 5. In block 408, the magnification facility sums the obscured content areas for each of the visible content elements to determine a total obscured area and divides that by the content area of the markup language document to determine the ratio. This ratio may be used to determine whether the markup language document as a whole should be marked as obscured, such as by determining whether the ratio is above a threshold, which would indicate that more than a threshold amount of the visible content elements of the markup language documents are obscured. Once the ratio is calculated in block 408, the process 400 ends. The ratio may be used, following the process 400, in various ways, such as to determine whether a markup language document is obscured as a result of application of one zoom technique and whether a different zoom technique should be applied.

While FIG. 4 discusses an example of a process for determining whether a markup language document is obscured that includes determining a ratio indicating a degree to which the content is obscured, it should be appreciated that embodiments are not so limited. In some embodiments, for example, a magnification facility may determine whether a display of a markup language document is obscured as a binary result, such as a yes or no or true or false answer. Such a binary result may be calculated in any suitable manner. In some embodiments, the binary result may be calculated based on amounts by which individual visible content elements are obscured, such as the amounts determined in block 406. In some embodiments, a content area of the markup language document may not be used in the determination. For example, in some embodiments, if any area of any content element is determined to be obscured, a determination may be made that the content of the markup language document is obscured.

In the example of FIG. 4, the magnification facility was described as identifying all of the visible content elements of a markup language document, or all of the visible content elements save for some that did not have dimensions beyond some threshold. It should be appreciated that embodiments are not so limited. In other embodiments, rather than identifying all visible content elements in block 402, the magnification facility may evaluate a set of elements of the markup language document to identify only certain types of visible content elements. The types of visible content elements that are evaluated in such an embodiment may be those content elements that would be most indicative of content being obscured. For example, visible content elements that are "floaters" without a fixed position (which may be identified through evaluating markup elements describing the elements as not having a fixed position) may be evaluated. Such floaters may, when content is obscured, be positioned over other elements and obscure the other elements. By evaluating only these "floater" elements, the magnification facility may be able to quickly identify whether content has become obscured. This may be advantageous in some scenarios, such as in the example of FIG. 3B where the evaluation of whether content is obscured at various zoom levels is repeated multiple times before the visible content elements are displayed to a user and, as such, the analysis at each zoom level must be completed quickly.

As discussed above, in some embodiments a determination of whether content has become obscured may, in some embodiments, be determined based at least in part on a content area of a markup language document. The content area may be determined in any suitable manner, an example of which is illustrated in FIG. 5.

Figure 5:
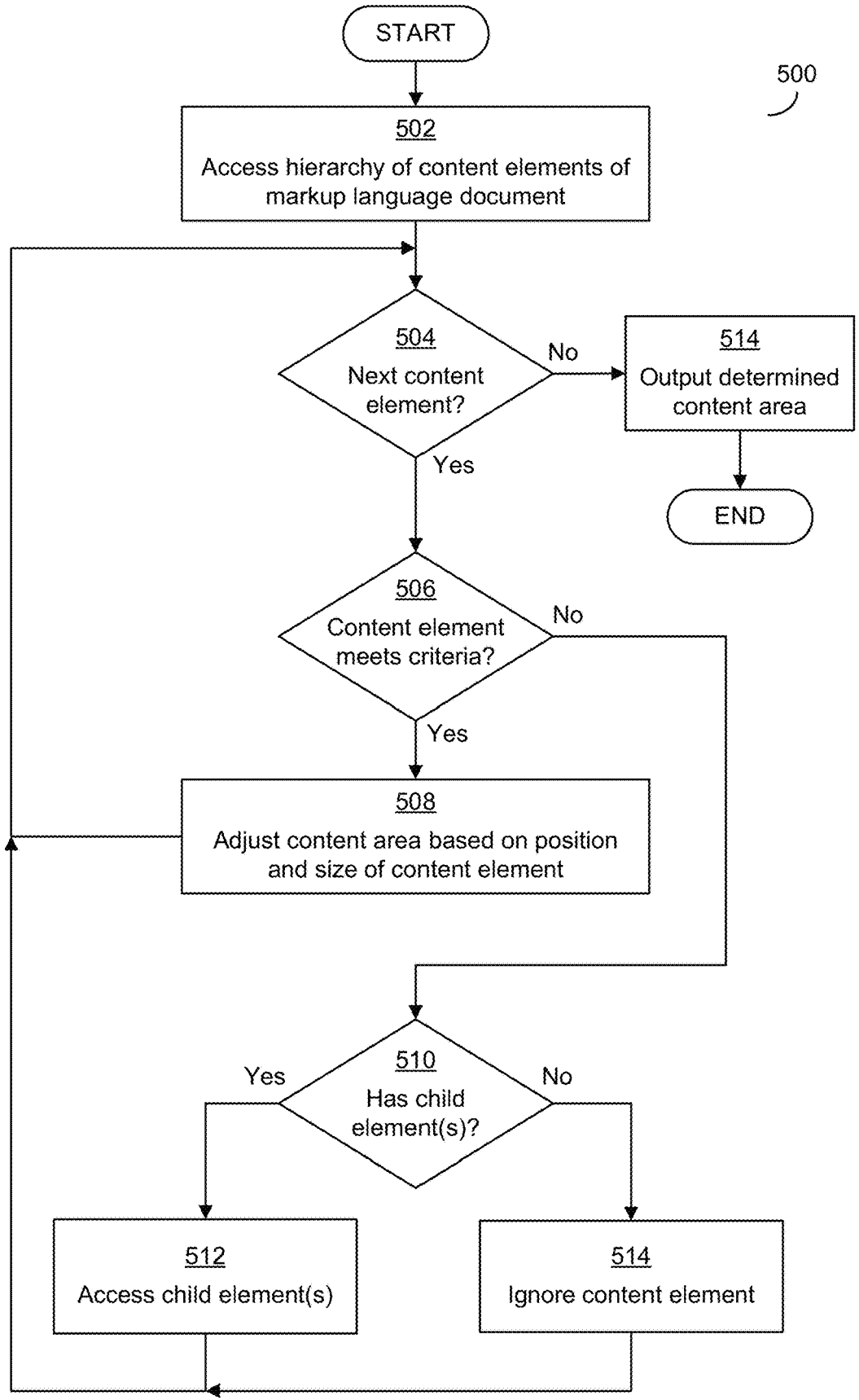
FIG. 5 is a flowchart of an exemplary technique that may be implemented by a magnification facility for identifying the dimensions of a content area of one or more markup language documents.

The process of FIG. 5 may be carried out when a magnification facility is downloaded and executed by a viewing application and, as with other examples above, before user input is received requesting increase of display size of visible content elements and, in some embodiments, before visible content elements are displayed. The process 500 begins in block 502, in which the magnification facility accesses a data structure of elements of the markup language document, which may be a hierarchical data structure such as the DOM discussed above. The magnification facility may then begin processing each element of the markup language document as identified by the data structure, examining different elements identified by the data structure to determine positions and sizes of individual elements and, from those, the dimensions of a content area of the markup language document that encompasses each of the visible content elements of that document.

The magnification facility processes the hierarchy of content elements using a loop that begins in block 504. In block 504, the magnification facility selects a next, as-yet-unexamined content element from among the content elements at the level of the hierarchy currently being examined. From there, the magnification facility performs a depth-first search of the hierarchy, examining each of the elements. More specifically, in block 504 the magnification facility determines if there is a next content element to be examined, which it determines by first evaluating whether there is a next content element at the current level of the hierarchy and, if not, by evaluating whether there is a next content element at one or more higher levels of the hierarchy. When a next content element exists, it is selected and evaluated in block 506.

In block 506, the magnification facility determines whether the currently-selected content element (which may not be a visible content element) meets one or more criteria. The criteria that are evaluated may serve to identify content elements that are visible content elements and that may be elements that may affect the dimensions of the content area. For example, the evaluation of block 506 may include determining whether the currently-selected content element is visible (rather than being configured as invisible) and is colored differently from a background of the markup language document. The evaluation of block 506 may also include determining whether the content element is a container of other elements and, if so, whether the container is configured to center the display of those other elements. Such container elements are unlikely to affect the dimensions of the content area and, as such, the magnification facility in block 506 is looking for elements that are not containers that center display of elements. As another example, the evaluation of block 506 may include determining whether content elements have more than a threshold width (e.g., 4 pixels). As another example, the evaluation of block 506 may include determining whether the position of the left side of the element is not at the left side of the display area (e.g., the X-position of the left side of the element is not zero). Elements with a left side that is disposed exactly at the left side of the display area are often containers for other elements and it may be more efficient to review the elements within the container rather than the container itself.

If the currently-selected element satisfies the criteria of block 506, then in block 508 the magnification facility adjusts the content area based on a position and size of the content elements. The magnification facility may, for example, compare the position and size of the currently-selected content element to the current dimensions of the content area (which may begin as zero dimensions and expand as content elements are evaluated) to determine whether any portion of the content element falls outside the content area. If any portion of the content element falls outside the content area, the content area is expanded. The content area may be expanded as a rectangle that includes all parts of all content elements satisfying the criteria of block 506. If the currently-selected content element falls within the current dimensions of the content area, the content area is not adjusted in block 508 based on that content element. Once the content area is adjusted if necessary, the magnification facility loops back to block 504 to select a next content element, if there remain any unexamined content elements.

If, however, in block 506 the magnification facility determines that the currently-selected element does not satisfy the criteria of block 506, then the magnification facility determines in block 510 whether the currently-selected content element has any "child" elements in the hierarchy, which are elements disposed at a level of the hierarchy below the currently-selected content element and linked to the currently-selected content element in the hierarchy. If so, then in block 512 the magnification facility moves to the lower level of the hierarchy and loops back to block 504, where the next content element at the current level of the hierarchy (which, as a result of block 512 is the lower level of the hierarchy) is selected. If, however, the magnification facility determines in block 510 that the currently-selected element does not have any child elements, then the magnification facility in block 514 ignores the currently-selected content element and takes no action, then loops back to block 504 to select a next content element as described above.

As should be appreciated from the foregoing description of block 504, the magnification facility will continue evaluating content elements in the depth-first approach until no more content elements remain to be evaluated. At that time, the magnification facility will determine, in block 504, that there is no next content element that may be selected. The magnification facility will then, in block 514, output the determined content area. The determined content area may be output in any suitable manner, including by storing the determined content area in a variable of the magnification facility or otherwise storing the determined content area. The process 500 then ends. As a result of the process 500, the magnification facility is aware of dimensions of the content area, which may include a total area (e.g., in pixels) of the content area and may use the content area in various ways. For example, the content area may be used in determining a ratio of an obscured area to a content area, as discussed above in connection with FIG. 4.

Various techniques have been discussed in connection with FIGS. 2-5 for configuring a magnification facility to use different zoom techniques at different times or for determining, at a time, which of various zoom techniques to use. Any of various zoom techniques may be used with the foregoing techniques. Examples of zoom techniques are described below in connection with FIGS. 6A-8.

Figure 6A:
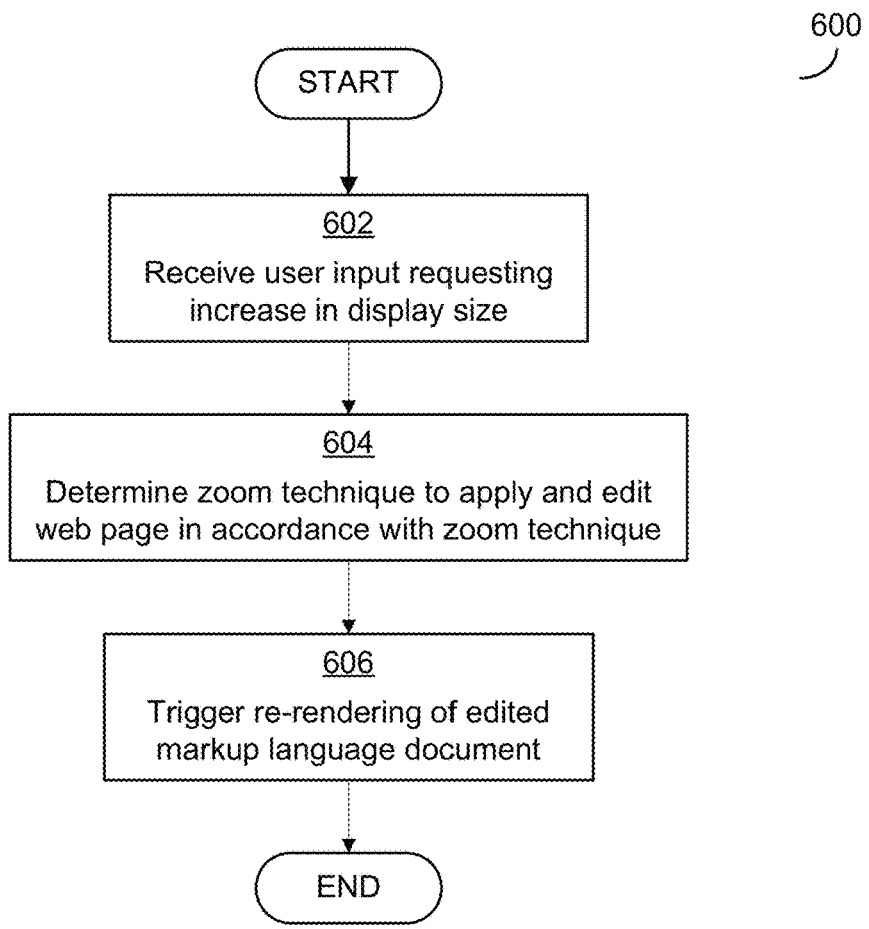
FIGS. 6A-6D are flowcharts of exemplary processes for applying zoom techniques to visible content elements of one or more markup language documents.

FIG. 6A is a flowchart of a process 600 that may be implemented by a magnification facility in performing some zoom techniques. The process 600 begins in block 602, in which the magnification facility receives user input requesting an increase in the display size of visible content elements of a markup language document with respect to a default display size. As discussed above, the user input may be in any suitable form, as embodiments are not limited in this respect. In response, in block 604 the magnification facility determines which zoom technique to apply in accordance with the configuration of the magnification facility (e.g., configurations described above) and/or in accordance with one or more conditions (e.g., conditions described above) and then applies the zoom technique. Applying the zoom technique may involve editing one or more markup elements of the markup language document. Editing the one or more markup elements may include modifying existing markup elements and/or inserting new markup elements into the markup language document. The editing of the markup elements may include any suitable editing, and may include editing the markup elements (including by inserting new markup elements) to adjust a size of a display area, adjust a scaling of visible content elements and/or a point from which the scaling is performed, shift a position of one or more content elements, or any other suitable editing. In a case that the user input received in block 602 was not the first user input received that requested increase in the display size, the editing of block 604 may include editing markup elements that were previously inserted or modified, and may include undoing some edits previously made such as by removing markup elements previously inserted. Undoing edits previously made may be performed when the zoom technique to be applied is to change in block 604 from zoom techniques that were previously applied.

In block 606, following the editing of the markup elements of the markup language document performed as part of the zoom technique, the magnification facility triggers a re-rendering of the markup language document. Through the re-rendering, the visible content elements are displayed with increased size relative to the default display size and relative to a previously-displayed size of the visible content elements. The re-rendering may be triggered in any suitable manner, including using known techniques, as embodiments are not limited in this respect. Once the re-rendering is triggered, the process 600 ends.

The example of FIG. 6A did not describe any particular manner in which markup elements of a markup language document may be edited to increase a display size of visible content elements of the markup language document. Various edits may be made to a markup language document to increase a display size of visible content elements. Examples of edits that may be made are discussed below in connection with FIGS. 6B-6D.

Figure 6B:
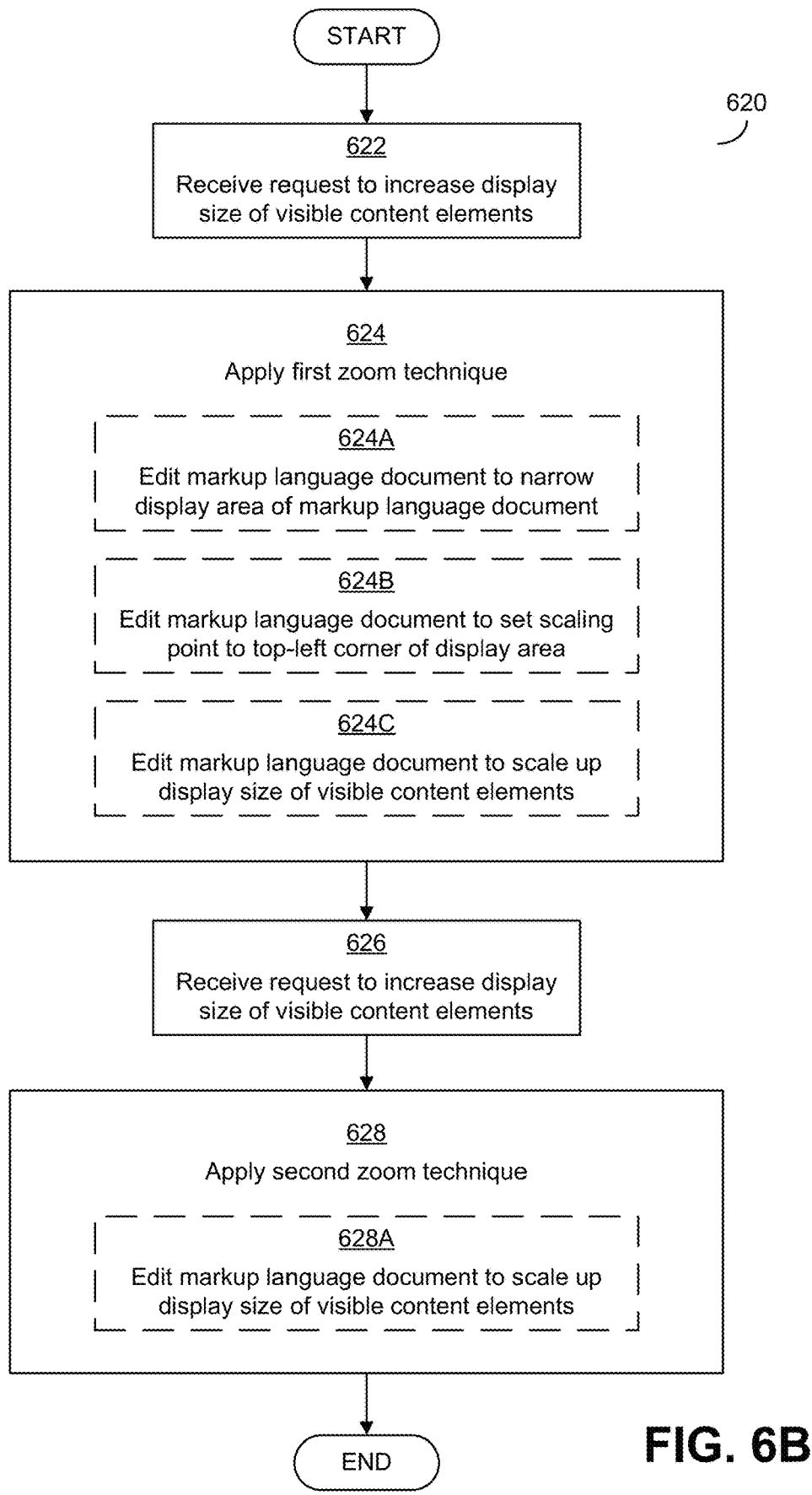
Figure 6C:
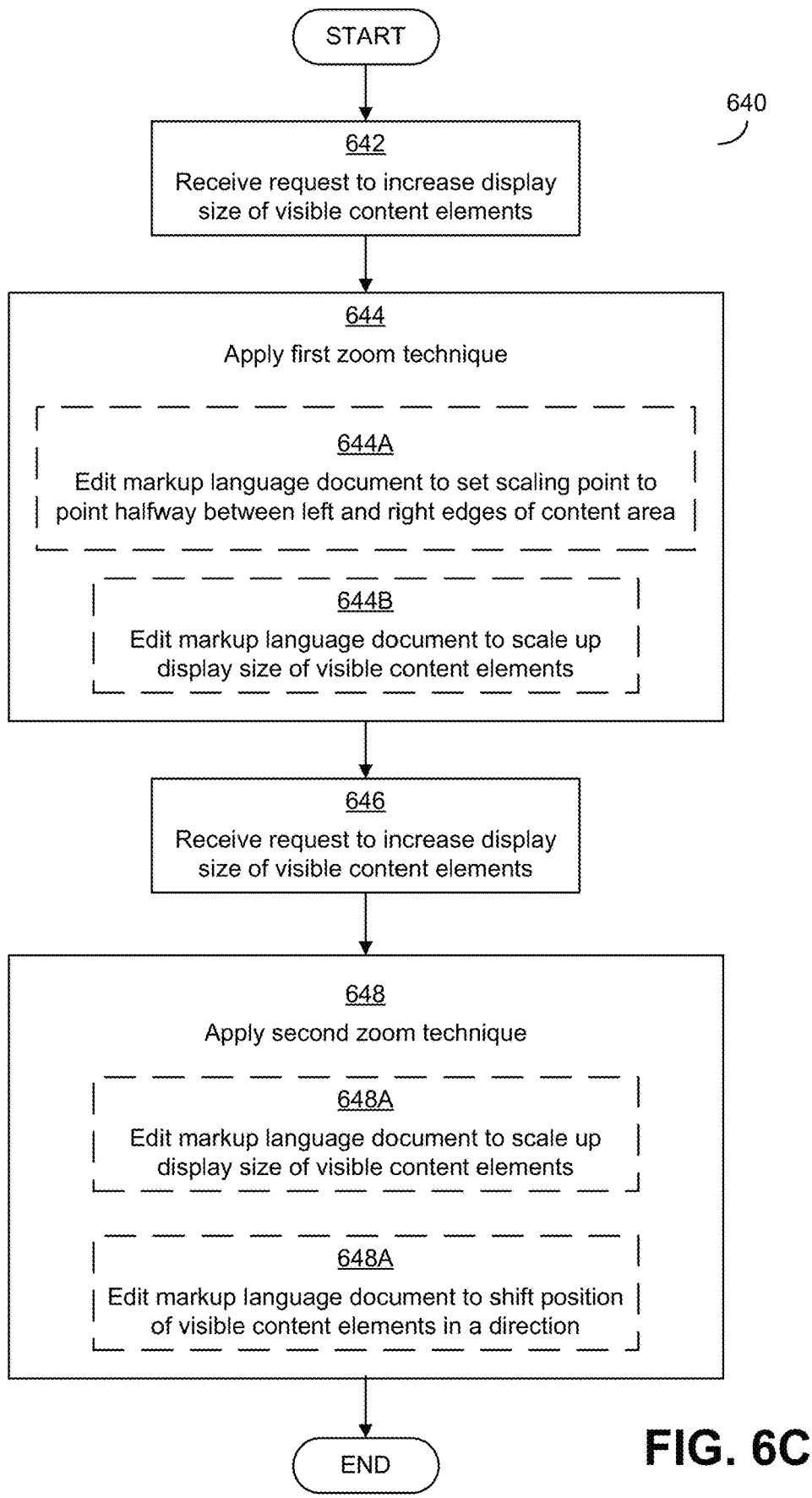

In each of the examples of FIGS. 6B and 6C, two different zoom techniques are applied. Prior to the start of these exemplary processes, any of the various techniques described above that relate to configuring the magnification facility may be performed and, as a result, the magnification facility may be configured to apply the zoom techniques of these processes in response to receiving user input. Additionally or alternatively, prior to the start of the processes, a condition (e.g., any of the examples of conditions discussed above in connection with FIGS. 3A-3C) may have been evaluated and, in accordance with the condition being met (or not met), the magnification facility may be triggered to perform the zoom technique of the processes.

Further, for ease of illustration and explanation, the examples of FIGS. 6B and 6C illustrate application of one zoom technique and then another, without an explicit consideration of one or more conditions to switch between them. It should be appreciated, however, that a switch between zoom techniques as in these examples may be triggered by a condition being satisfied, including any of the conditions described above in connection with FIGS. 3A-3C.

The process 620 of the example of FIG. 6B begins in block 622, in which the magnification facility receives user input requesting increase of a display size of visible content elements of a markup language document. In response, in block 624 the magnification facility applies a first zoom technique. As illustrated in block 624, the application of the first zoom technique may involve making at least three edits to the markup language document.

The example of FIG. 6B may be used for any of various markup language documents, but may be advantageously used in cases in which the markup language document has a fluid layout. The magnification facility may take advantage of the fluid layout of the markup language document as part of the first zoom technique. In particular, in block 624A, the magnification facility edits the markup language document to programmatically narrow a display area in which the markup language document is to be displayed. In block 624A, the display area itself of the user interface of the viewing application may not be adjusted. Rather, only a portion of the display area that is available for being populated by the content of the markup language document is adjusted. Narrowing the display area in this way may have advantages for markup language documents that have fluid layouts. Using some techniques to increase a display size of a content element, which may include the techniques applied in blocks 624B and 624C, all parts of a content area of a markup language document are increased in size proportionally—which may include increasing the size of whitespace such as a left-side margin or other content-less whitespace in the display of the markup language document. Increasing the size of the whitespace may be disadvantageous, as it will occupy more space in a display without content and may, in some cases, result in visible content elements being pushed off the side of the display area (the actual display area of the viewing application) due to the expanding whitespace. Pushing content outside of the display area of the viewing application may be disadvantageous, as it may force a user to pan the content area to view all parts of the markup language document. It would therefore be advantageous to reduce the size of the whitespace in the increased size of the markup language document. By narrowing the width of the display area for a markup language document with a fluid layout, the whitespace may be narrowed while other elements of the markup language document may be maintained at a same size. Accordingly, in an enlarged version of the markup language document, whitespace may be smaller than it would otherwise be and other elements of the markup language document may be maintained inside a display area of the viewing application for more levels of magnification than otherwise.

The edit of block 624A may be made in any suitable manner. In some embodiments, the magnification facility may determine a current width in pixels of the display area and then calculate a reduced width based on that width and an amount by which the display size is to be increased in block 624. If the display size is to be increased by 10 percent, then in block 624A the facility may calculate a reduced width that is 10 percent less than the current width. As another example, the facility may calculate the reduced width by dividing the original width by the cumulative zoom level, expressed as a decimal. The magnification facility may then edit a markup element identifying that reduced width. For example, for a markup language document that is a web page, the magnification facility may edit a style element (e.g., "<style>") that includes a CSS markup element "width: XXXpx;", where the XXX is replaced by the magnification facility with the calculated reduced width. In some cases, such as a first time that the first zoom technique is applied, the editing of block 624A may include inserting a new "width" markup element into a style element or CSS file (and may include creating a new style element or CSS file) with the calculated reduced width.

In block 624B and 624C, the magnification facility may increase the display size of the visible content elements of the markup language document. To do so, in the example of FIG. 6B the magnification facility may use transform elements to scale up the size of the visible content elements, such as by using CSS transform elements in the case that a markup language document is a web page. In block 624B, the magnification facility may configure the viewing application to perform the scaling transform in a particular manner by scaling from a point in a top-left of the display area of the viewing application. To make this edit, the magnification facility may edit a new markup element "transform-origin: 0 0;" In some embodiments, the editing of block 624B may include inserting the markup element or confirming that the markup element was previously inserted or is otherwise present in the markup language document. This markup language element may be inserted or present in the same style element (or CSS file) as was edited in block 624A. In addition to setting the scaling point in block 624B, the magnification facility in block 624C edits a markup element to specify an amount by which content is to be scaled. The editing of block 624C may include editing a markup element "transform: scale (YYY);", where the YYY is replaced by the magnification facility with the zoom level to be applied expressed as a decimal (e.g., with 100 percent being 1.0). In some cases, such as a first time that the first zoom technique is applied, the editing of block 624C may include inserting a new "scale" markup element into a style element or CSS file with the zoom level.

The first zoom technique of the example of FIG. 6B includes shrinking a width of a display area to try to shrink an amount of whitespace of a markup language document before increasing the display size, to avoid increasing the display size of the whitespace. In some embodiments, this may help achieve a goal of magnifying content in a manner that accounts for preserving readability of visible content elements, such as by temporarily preventing some of the visible content elements from running off an edge of the display area. However, those skilled in the art will appreciate that there is a point at which narrowing the display area of a markup language document having a fluid layout will no longer impact only whitespace, but may lead to visible content elements becoming obscured. For example, as should be appreciated from the above discussion of how content may become obscured, narrowing a width of a display area for a markup language document having a fluid layout may lead to content overlapping or becoming misarranged, or text having column widths narrow enough to impede reading of the text. Accordingly, at a point it may become disadvantageous to narrow the display width more, as the narrowing may have more of an obscuring effect on content elements than merely allowing content elements to be at least partially positioned off an edge of the display area. This point may be identified or represented by a criterion that is evaluated and, when met, leads to a switching from the first zoom technique to a second zoom technique. Any of the examples of criterion of FIGS. 3A-3C may be used to accomplish this goal in embodiments.

Accordingly, once the criterion is met the magnification facility may stop applying the first zoom technique and, thereby, stop narrowing the width of the display area.

In block 626, the magnification facility receives another user input requesting further increase in the display size of the visible content elements. As mentioned above, the determination of whether the criterion is met is not explicitly shown in FIG. 6B, but in response to receipt of the user input in block 626 (and a determination that the criterion has been met) the magnification facility applies the second zoom technique in block 628. The second zoom technique is similar to the first, in that a scaling transform is used. As illustrated in FIG. 6B, the application of the second zoom technique in block 628 includes, in block 628A, editing the markup elements to change a scaling that is used. The edit that is made in block 628A may be the same type of edit that was discussed above in connection with block 624C. The second zoom technique may use the same scaling point as was used by the first zoom technique, but may not need to insert that markup element in block 628 as the markup element was previously inserted as part of the editing of block 624B. Further, while the second zoom technique may not continue to narrow a width of the display area, the second zoom technique may increase the display size of the display of the markup language document resulting from the application of the first zoom technique. The magnification facility, in applying the second zoom technique, may therefore not edit the markup language document to remove the markup elements inserted by application of the first zoom technique, including the markup element to narrow the width of the display area. In addition, as the magnification does not edit the width of the display area in block 628, as the display size of the visible content elements increases, some of the content may begin to extend off an edge of the display area, such as off a right side of the display area. Though this may result in some content being obscured by being outside of the display area and not visible, allowing the content to extend off the edge of the display area in this manner may preserve readability of the content more than the obscuring, such as causing overlapping of elements or narrow text columns, that may result from narrowing the display area further.

Once the second zoom technique is applied in block 628, the process 620 ends.

FIG. 6C illustrates another example of a technique that may be used in some embodiments for applying a pair of zoom techniques. The process 640 of the example of FIG. 6C begins in block 642, in which the magnification facility receives user input requesting increase of a display size of visible content elements of a markup language document. In response, in block 644 the magnification facility applies a first zoom technique (different from the first zoom technique of FIG. 6B). As illustrated in block 644, the application of the first zoom technique may involve making at least two edits to the markup language document.

The example of FIG. 6C may be used for various markup language documents, but may be advantageously used for markup language documents that do not have a fluid layout. Because the documents do not have a fluid layout, relative positions between the elements of the markup language document are fixed. As such, reducing a width of the display area would not have an effect on whitespace of the markup language document. The first zoom technique of the example of FIG. 6C therefore does not include a step of narrowing the display width.

The first zoom technique of FIG. 6C, as with both zoom techniques of FIG. 6B, uses transform scaling to increase a display size of visible content elements. Accordingly, the editing of blocks 644A and 644B include edits that are similar in many ways to the editing of blocks 624B and 624C. However, a difference between them is the scaling point that is set in block 644A. The editing of block 644B included specifying a top-left corner of the display area as the point from which scaling should be performed. For markup language documents to which the first zoom technique of FIG. 6C is applied, however—including documents without a fluid layout—a different scaling point is used. The inventors have recognized and appreciated that many markup language documents that do not have a fluid layout also have a layout in which visible content elements are centered in a display area, often with empty margins (e.g., margins that only show a background of the document) on either side of the visible content elements. Scaling the visible content elements from the top-left point would preserve at least the left-side margin in a way that would be disadvantageous for wasting display area while visible content elements may extend off a right edge of the display area. In accordance with techniques described herein for increasing a display size in a manner that preserves readability, a different scaling point is used. For example, a point that is in the middle of the display area of the viewing application, which may be a point halfway between a left edge and a right edge of the display area, may be selected as the point from which the scaling is performed. The point may also, in some cases, be on a top edge of the display area. Accordingly, rather than editing a markup element "transform-origin: 0 0;" as in the example of block 624B, the "0 0" are replaced with pixel coordinates of the selected point that is halfway across the display area. In addition to setting the scaling point in block 644A, in block 644B the magnification facility may edit one or more markup elements to set a scaling amount, as in the example of block 624C.

Those skilled in the art will appreciate, however, that there is a limit to an amount by which content may be scaled from the middle outward before extends off both the left edge and right edge of the display area. Accordingly, when this first zoom technique is used, a criterion may be evaluated (as in the examples of FIGS. 3A-3C) to determine when content has extended off an edge of the display area and another technique is to be used. In the example of FIG. 6C, once the content extends off an edge of a display area the zoom technique is changed to the second zoom technique of FIG. 6C.

In block 626, the magnification facility receives another user input requesting further increase in the display size of the visible content elements. As mentioned above, the determination of whether the criterion is met is not explicitly shown in FIG. 6c, but in response to receipt of the user input in block 646 (and a determination that the criterion has been met) the magnification facility applies the second zoom technique in block 648. Applying the second zoom technique includes, in block 648A, editing the markup elements to scale the visible content elements as in block 644B (using the same scale point as before). The second zoom technique of FIG. 6C, however, also includes editing the markup elements such that visible content elements extend off a right side of a display area rather than the left side. To do so, the magnification facility in block 648B acts to modify a position of the visible content elements. In particular, the magnification facility edits the markup language document to insert into an style element or CSS file (the same style element or CSS file that was edited by the first zoom technique in block 644) to insert a CSS markup "transform: translate(ZZZ);" where the ZZZ is replaced with an amount of pixels by which the visible content elements are to be shifted in a direction (e.g., to the right). The magnification facility may calculate the number of pixels in any suitable manner, including by calculating the number of pixels based on the zoom level, such as by shifting the visible content elements by a number of pixels by which the visible content elements would otherwise extend off a side (e.g., the left side) of a display area once the display size is increased if the visible content elements were not shifted. Accordingly, through application of the second zoom technique visible content elements may extend off a right side of the display area and be at least partially obscured. However, users may be more comfortable panning to the right to view content extending off a right side of a display area than they are panning to the left to view content extending off a left side of the display area. As such, the shifting of block 644B may ensure that content does not extend off a left side of the display area and instead extends only off a right side, at least before the user pans the content. Once the editing of block 648 is performed, the process 640 ends.

The zoom techniques of FIGS. 6B and 6C included applying transforms to a markup language document, including CSS transforms. In some embodiments, to allow for a smoother increase in display size, the magnification facility may make further edits that allow for animating the increase in display size or the shifting of content elements. The animating may be enabled in any suitable manner, as embodiments are not limited in this respect. In some embodiments, for example, the magnification facility may trigger the animating through making all or some of the edits of FIGS. 6B and 6C as a series of smaller edits that together would produce an effect like animation. In other embodiments, a viewing application may support a transition markup element that specifies a speed at which a transform should be applied and the magnification facility may use this speed markup element to effect the animation. By using the transition markup element to slow application of the transform, an animation effect may be achieved.

Figure 6D:
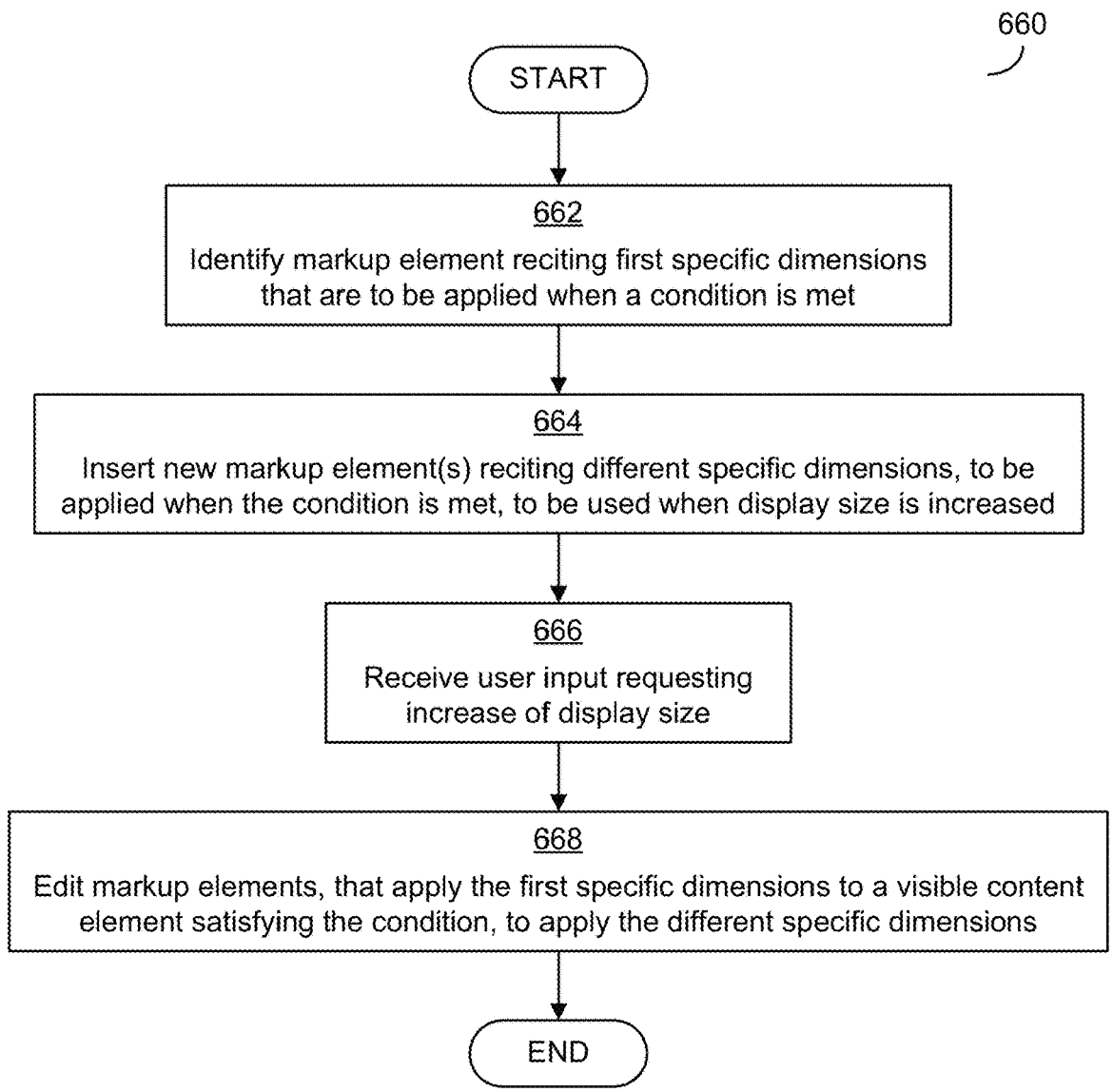

It should be appreciated, however, that embodiments are not limited to using transform effects to perform zoom techniques in accordance with techniques described herein. FIG. 6D illustrates another example of a zoom technique that does not use transforms.

Some markup language documents include markup elements that specify formatting to be applied when one or more conditions are met. For example, the condition may relate to the viewing application or the device on which the viewing application is executing, and may specify formatting to be applied when the markup language document is processed by a viewing application or device that satisfies the condition. As specific examples of conditions, the condition may relate to a width of a display area of the viewing application or to whether the device is a personal computer (e.g., desktop or laptop) or a mobile device (e.g., tablet or phone). As another example of such markup elements, the condition may relate to content described by the markup language document and may specify formatting to be applied when markup elements describing content satisfy the condition, such as by explicitly indicating that the formatting is to be applied.

Media queries and HTML/CSS styles are examples of such markup elements that specify formatting that is to be applied when conditions are met. An example of an HTML/CSS style is:

h1 {width: 100px}

This specifies attributes of a style "h1." Other markup elements may explicitly specify that style in connection with particular content elements to indicate that the content elements should be displayed with the attributes of that style. Thus, this style indicates that when a condition is met— when another markup element explicitly refers to this style in connection with a content element—that these formatting attributes should be applied, namely that the width of that content element should be set to 100 pixels.

An example of a media query is:

```
@media (max-width=600px) {
    h1 {
        width: 50px;
    }
}
```

This example specifies that when a condition is met, namely, that the display area of the viewing application has a width of up to 600 pixels, then a formatting is applied. The formatting that is applied has another condition similar to the HTML/CSS style markup discussed above, namely that when a content element has been explicitly identified as one to which the "h1" style is to be applied, that content element should be displayed with a maximum width of 50 pixels.

These are examples of formatting that may be applied to content elements of a markup language document. Various types of formatting may be applied. As another example, formatting may specify that a particular image having particular dimensions is to be used when a condition is met. As another example, formatting may specify a font size or other font dimensions for text.

The inventors have recognized and appreciated that these markup elements that specify dimensions may be advantageously edited as part of a zoom technique to allow for magnification that preserves readability or layout of a markup language document. For example, where one of these markup elements specifies a specific width that should be used for an element, it may be advantageous to specify a narrower width of that element as part of a magnification. Similar to the technique discussed above in connection with FIG. 6B for mitigating the effects of whitespace, narrowing an element in this way prior to expanding it may preserve a layout of the page or readability, or mitigate an obscuring of content of the page. As another example, where one of these markup elements specifies that a specific image that has a specific dimension should be displayed, it may be advantageous to edit the markup element (or insert a new markup element) to refer to a different image having different dimensions. The different dimensions may be larger dimensions, such that the magnification may be performed by specifying that a larger image should be used in place of the original image. As still another example, where a markup element indicates that a particular font size should be used for text, the magnification may be carried out by editing the markup element (or inserting a new markup element) to specify that a larger font size should be used.

FIG. 6D illustrates an example of a process that may be used to edit such markup elements as part of a zoom technique. It should be appreciated that, in some embodiments, the markup element editing of FIG. 6D may be combined with other zoom techniques described herein, such that a zoom technique may operate in accordance with other zoom techniques but additionally include editing markup elements in accordance with FIG. 6D.

The process 660 of FIG. 6D begins in block 662, in which the magnification facility evaluates a markup language document to identify in the document markup elements reciting specific dimensions to be used when conditions are met. Examples of such markup elements, conditions, and dimensions are discussed above, including examples of media queries and HTML/CSS markup that specifies dimensions to be used when a condition is met.

In block 664, the magnification facility inserts new markup elements into the markup language document, to add new markup elements alongside the markup elements that were identified in block 662. The new markup elements that are inserted may correspond to the markup elements identified in block 662 and may have attributes that are selected based on the attributes of a corresponding element. For example, a markup element inserted in block 664 may have a condition and/or formatting (e.g., dimension) that is the same as or related to the condition/formatting of the corresponding markup element.

To use one of the examples above, an HTML/CSS style markup element for style "h1" may have a condition that its formatting applies when another markup element explicitly identifies that the style "h1" should be applied to a content element. In this case, in block 664 the magnification facility may insert into the markup language document another markup element with the same condition, in that the markup element may specify a formatting to be used for style "h1." The dimensions that are specified by a new markup element may correspond to the dimensions in the markup element to which it relates. For example, the dimensions may be adjusted by a factor based on an amount by which the display size is to be increased. Thus, when the display size is to be increased by 10 percent, the dimensions of the new markup element that is inserted may be 10 percent greater (or, in some cases, 10 percent less) than the dimensions of the corresponding markup element.

In some cases, the condition may also be determined by the magnification facility based on the condition of the markup element, identified in block 662, to which it corresponds. For example, a media query identified in block 662 may specify a condition related to a width of a display area and formatting to be applied when the condition is met. In block 664, the magnification facility may insert a new media query having a different formatting (e.g., dimensions calculated based on dimensions recited by the original media query) and may additional have a different width specified in the condition, such as a width that is 10 percent narrower than the width specified by the condition of the original media query. This new media query may thus specify that when a display area is narrowed (e.g., through the zoom technique discussed above in connection with FIG. 6B), the formatting specified by the new media query should be applied.

In some embodiments, the markup elements that are inserted in block 664 may include multiple markup elements that correspond to one of the markup elements identified in block 662. Each of the multiple markup elements may be for a different zoom level and recite different dimensions, but may recite a same condition.

In some embodiments, the markup elements that are inserted in block 664 may include the same condition as a corresponding markup element identified in block 662, but may include an additional condition as well. The additional condition may relate to the zoom level to be applied, or simply whether the display size is to be increased. For example, a markup element may specify a condition that is related to a style (e.g., the "h1" example used above) but may additionally recite that the style be used when a display size is to be increased. In such embodiments, the additional condition may be specified in any suitable manner. For example, in some embodiments a new style may be specified, such as "h1_110", which is to be applied to all of the content elements that, by default, were to be displayed with style "h1" and when the display size is to be increased by 10 percent. Such an approach may be disadvantageous in some cases, however, because for the new style "h1_110" to be applied, all existing markup elements specifying style "h1" would be edited (e.g., in block 668 discussed below) to refer to style "h1_110" and performing this editing may take long enough that a user may wait longer than the user is comfortable with for a magnification to be completed. A different approach may mitigate this difficulty. Instead of inserting individual styles, a group of styles may be created, or multiple groups of styles that each relate to different zoom levels. For example, a markup element may be inserted specifying a group "magnification_110" that includes multiple different styles that should be applied when the display size of the visible content elements is to be increased by 10 percent. For example, the "magnification_110" group may include an "h1" style and multiple other styles. Each of the styles within the "magnification_110" group may be created as discussed above and correspond to a style defined by markup elements identified in block 662. Through the use of this group, the style names may stay the same and individual markup elements that apply styles to particular content elements may not need to be edited to apply the magnified style to content elements. Instead, the magnification facility may (e.g., in block 668 discussed below) edit, which may include inserting, a markup element to apply the group of styles to a section or an entirety of the markup language document, such as by specifying that the section or entirety is to be processed using the styles in the "magnification_110" group. By doing so, when the viewing application processes a markup element that refers to style "h1," the viewing application may identify the style as the "h1" within the "magnification_110" group rather than the default "h1," and use the style defined by the newly-inserted markup element for the style "h1" within the "magnification_110" group. As an alternative to groups, different style sheets may also be created that include the content that would otherwise be included in groups, and subsequently (e.g., in block 668) different style sheets may be activated or deactivated based on magnification.

Thus, in block 664 the magnification facility edits the markup language document to insert markup elements defining formatting, including dimensions, to be applied when conditions are met, with the conditions corresponding to conditions specified by previously-existing, corresponding markup elements identified in block 662 and the dimensions being based on the dimensions recited by the corresponding markup elements. The processing of blocks 662 and 664 may be performed at any time, including during a configuration phase of a magnification facility such as before visible content elements of a markup language document are displayed and/or before a user input requesting increase in a display size is received. By performing the identifying and editing of blocks 662 and 664 at this time, the editing may be completed before the user begins viewing or interacting with the markup language document and a time that the user waits while magnification is applied in response to a request may be lowered.

In block 666, the magnification facility receives user input requesting increase in a display size of visible content elements. The user input may be received in any suitable manner, as discussed above, as embodiments are not limited in this respect. In response, and in accordance with the zoom technique of FIG. 6D, the markup language document may make further edits to the markup language document to indicate that the markup elements that were edited (including inserted) in block 664 should be used in processing the markup language document. The magnification facility may not make edits in block 668 related to all types of markup elements that were edited in block 668. For example, as discussed above some of the markup elements edited in block 664 may be media queries. Such media queries may be considered self-actuating; they recite formatting to be applied when the viewing application determines that conditions (e.g., width of a display area) specified by the media queries are met. In these cases, the magnification facility may not need to perform additional editing for these markup elements in block 668, but may instead rely on the media queries to function as inserted. In other cases, however, such as in the case of HTML/CSS styles, the magnification facility in block 668 may make edits to instruct that the newly-specified styles for markup elements edited (including inserted) in block 664 are to be used. Any suitable editing may be performed in block 668, as embodiments are not limited in this respect. Two examples were given above in the discussion of block 664 of ways in which new markup elements may be inserted specifying new styles that are to be used when magnification is applied: styles specified using new style names such as "h1_110" and a grouping of styles within a group such as "magnification_110." In either case, the magnification facility may in block 668 make edits to instruct that these new styles are to be applied. For example, if new style names such as "h1_110" are inserted in block 664, in the case that the cumulative zoom level that would result from the user input of block 666 is 110 percent, then the magnification facility may in block 668 review each markup element that relates to particular content elements to identify markup elements that instruct application of style "h1" to a particular content element. For each of the markup elements, the magnification facility may edit the markup element to specify instead that style "h1_11" is to be applied to the particular content element. As mentioned above, however, editing each of the markup elements that apply style "h1" may be, for some markup language documents, a lengthy task. The other approach, using a group of styles such as "magnification_110" that includes style names corresponding to the existing styles identified in block 662, may be more efficient as a single edit or a small number of edits may be used to apply the style group to an entirety of or one or more sections of a markup language document. For example, a new markup element or attribute of a markup element (e.g., 'class="magnification_110"') may be inserted as a child of a "BODY" markup element or a "DOCUMENT" markup element to apply the style group to an entirety of the markup language document. In some such cases, the additional element may be inserted as a last element of a style element. Those skilled in the art will appreciate that placing the new markup element last indicates that it has the highest precedence and will not be inadvertently overwritten by other markup elements. In some embodiments, the new markup element may additionally or alternatively be flagged as having high importance, such as with an "!important" attribute, to ensure the new markup element is not overwritten. As discussed above in connection with block 664, a similar solution to using groups is using different style sheets that include the markup elements that would otherwise be included in different groups. In the case that different style sheets are used, the editing of block 668 may include editing the markup language document to activate a style sheet that corresponds to a zoom level to be used.

Through the editing of block 668, the markup language document is edited to instruct the viewing application, in processing the markup language document, to use the formatting (e.g., specific dimensions) specified by newly-inserted markup elements (inserted in block 664) instead of default formatting for the markup language document. The newly-inserted markup elements may have conditions and/or formatting that were specified based on original markup elements to which the newly-inserted markup elements correspond.

Once the editing of block 668 is completed, the process 660 ends.

Figure 7:
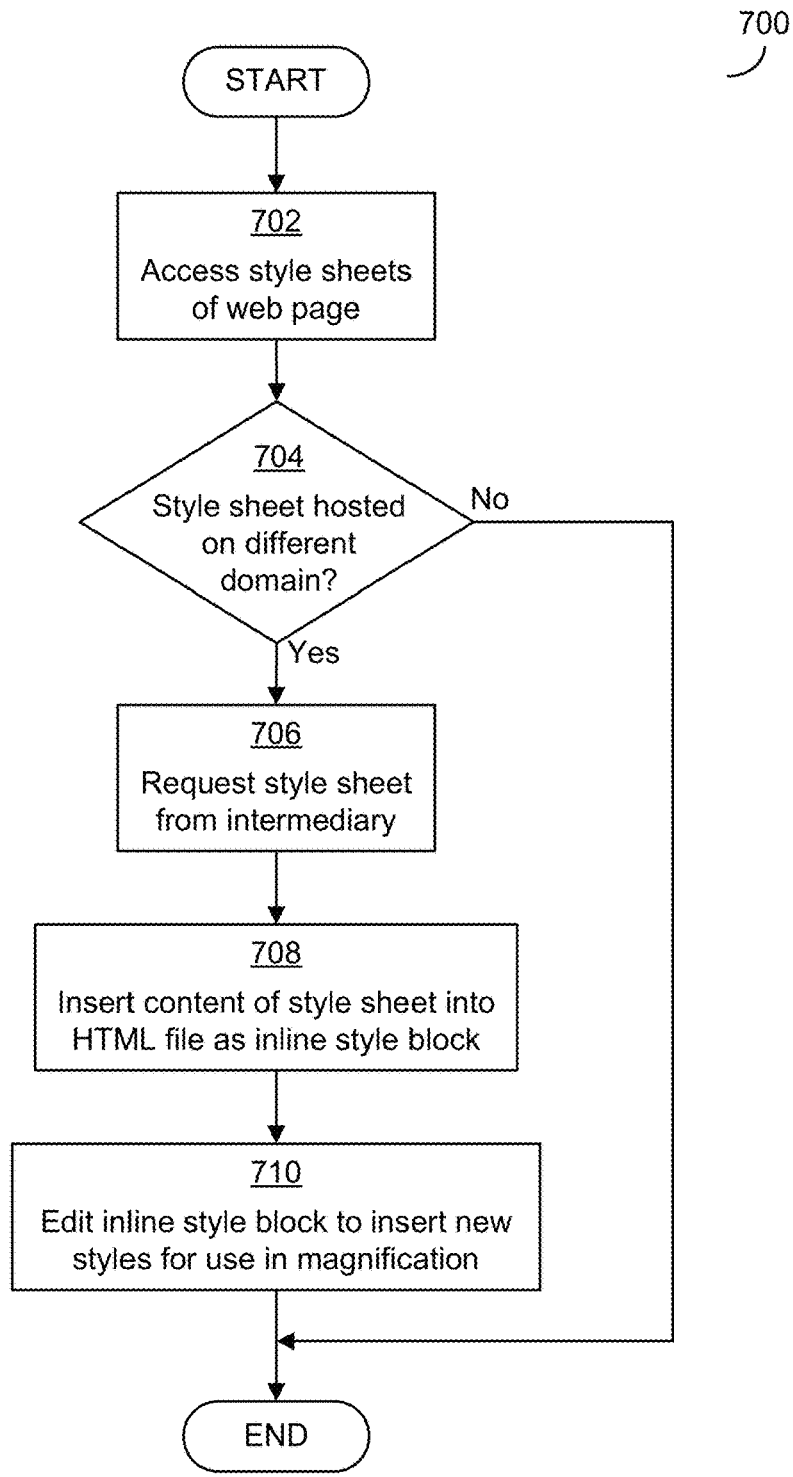
FIG. 7 is a flowchart of an illustrative process that may be implemented by a magnification facility to obtain content of a style sheet.

In the example of FIG. 6D, a magnification facility evaluates multiple markup elements, including markup elements that may be HTML/CSS markup elements defining styles. In some web pages, HTML/CSS markup elements may be disposed in a CSS style sheet that is separate from (but may be referenced by) a document into which the magnification facility is incorporated. Those skilled in the art will appreciate that in a case that the separate style sheet is downloaded by a viewing application from a same domain as the document into which the magnification facility is incorporated, the magnification facility will be permitted to review the markup elements of the style sheet. However, if the separate style sheet is downloaded from a different domain, then security procedures of the viewing application may prevent the magnification facility from accessing the style sheet and evaluating markup elements set forth therein. In some embodiments, therefore, the magnification facility may implement a work-around for accessing the content of the style sheet. FIG. 7 illustrates an example of a process that may be used in some embodiments.

The process 700 of FIG. 7 begins in block 702, in which the magnification facility accesses, or attempts to access, each of the style sheets referenced by a markup language document. In block 704, the facility determines whether it was unable to access any of the style sheets due to the style sheet having been downloaded by the viewing application from a different domain. The facility may make the determination in block 704 in any suitable manner, including by reviewing error messages presented by a viewing application in response to a failed attempt to access and/or by reviewing markup elements identifying the style sheets to determine addresses from which the style sheets were to be downloaded and determining if an address specifies a different domain. If the facility determines in block 704 that no style sheet was hosted on a different domain, then the process 700 ends. If, however, the facility determines in block 704 that one of the style sheets was downloaded from a different domain and could not be accessed, then the facility proceeds to use a work-around to access content of that style sheet.

In block 706, the magnification facility communicates with an intermediary, such as a proxy server or other server-side facility, and requests that the proxy server retrieve the style sheet and provide the style sheet to the magnification facility. The proxy server, using known techniques, retrieves the style sheet from its own data store or from a server for the domain at which the style sheet is hosted, and communicates the style sheet to the magnification facility. In block 708, the magnification facility accesses the received style sheet and inserts the markup elements of that style sheet into an HTML file as a style element. By inserting the markup elements into a style element, the magnification facility makes the markup elements available for evaluation by the magnification facility without needing to access the style sheet to which access is prohibited. In inserting the style element, the magnification facility may assign it an "id" attribute that corresponds to the URL from which the style sheet was originally downloaded. Because style elements have higher precedence than style sheets, the duplicated content of the style element may supersede the content of the style sheet. In some embodiments, this may be disadvantageous and, as such, the style element may be configured to be disabled. In block 710, once the style element is inserted, the evaluating and editing of markup elements described above in connection with FIG. 6D may be performed relative to the new style element rather than the style sheet to which access is prohibited, including by evaluating the style element and content thereof and creating a second style element that includes markup elements newly-inserted as a result of the process of FIG. 6D. The process 700 then ends.

In some embodiments, rather than using the proxy server or other intermediary, the magnification facility may send a Cross-Origin Resource Sharing (CORS) request for the style sheet to a server for the domain on which the style sheet is hosted. The server may, in accordance with CORS procedures, respond to the magnification facility with the style sheet. CORS procedures are known in the art and will not be discussed further herein.

Further, while the process 700 of FIG. 7 was described as creating a style element that included content of a style sheet to which access was prohibited, it should be appreciated that embodiments are not so limited. In some embodiments, a magnification facility may create a style element that includes the content of each of multiple style sheets referred to by a markup language document, such as by an HTML document. By creating one style element that includes all of the content of each of the style sheets referenced by an HTML document, all of the style that is defined for that application may be evaluated in one location. For example, the content of the style element may be queried to identify all content, including CSS styles and media queries, that may use specific dimensions, for use with the technique described above in connection with FIG. 6D. Though, the style element may be used for other reasons as well. For example, the style may be analyzed to identify a color scheme used for the markup language document. This may be useful as some color schemes may be difficult for some users to see or read, such as particular combinations of color. It may be helpful to these users to edit the markup language documents to use a different color scheme. In such a case, a technique similar to that of FIG. 6D may be used, such that related markup elements may be inserted that specify different colors. When all formatting/style information is compiled in one location, it may be quickly evaluated to identify markup elements within that formatting/style information that satisfy a criterion, such as that specific dimensions are specified, specific colors are specified, or for any other reason.

As discussed above in connection with FIG. 6D, in some cases a markup element may specify dimensions by specifying a specific image to be displayed, which has specific dimensions. Such markup elements may be used for a variety of images, including images to be displayed for cursors of pointing devices (e.g., mouse cursors). As mentioned above, traditional magnification techniques did not increase a display size of a cursor along with increasing a display size of web content. The inventors have recognized and appreciated that the same markup elements may be used for increasing a display size of a cursor of a pointing device, such as increasing the display size of the cursor at a time that a display size of visible content elements of a markup language document is to be increased.

Figure 8:
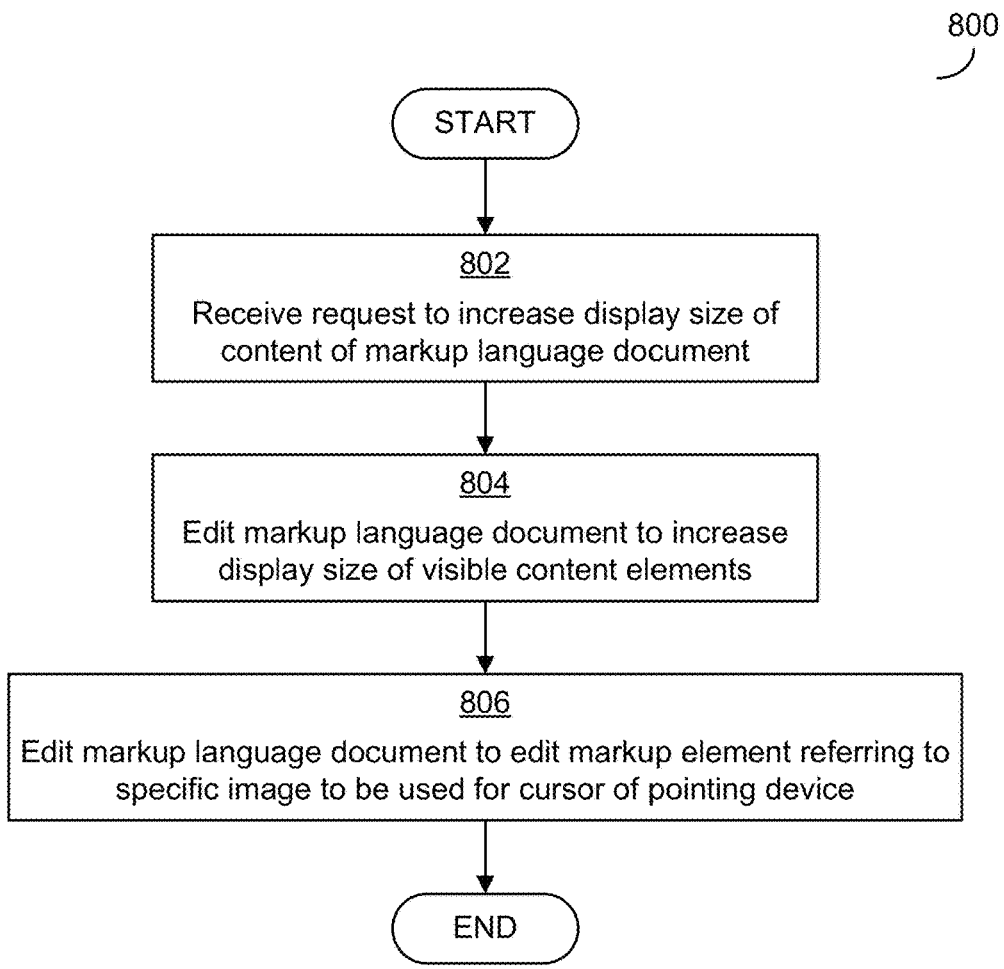
FIG. 8 is a flowchart of an illustrative process that may be implemented by a magnification facility to increase a display size of a cursor of a pointing device.

FIG. 8 illustrates an example of a process that may be implemented by a magnification facility in some embodiments to increase a display size of a cursor of a pointing device. The process 800 begins in block 802, in which the magnification facility receives user input requesting increase of a display size of visible content elements of a markup language document. In response to the user input, in block 804, the magnification facility edits the markup language document to increase the display size of the visible content elements, which may include making any suitable edits in accordance with any of the examples of zoom techniques described above. In addition, in block 806, the magnification facility edits the markup language document to increase a display size of the cursor of the pointing device. The increase in display size of block 806 may be the same or different as the increase of display size of block 804. For example, the magnification facility may increase the display size of the cursor at a slower rate, in response to repeated requests from the user for increase in the display size, than it increases a display size of the visible content elements.

In particular, in block 806, the magnification facility edits the markup language document to edit a markup element (which may include inserting a new markup element) to refer to a specific image to be used for the cursor of the pointing device. The specific image that is chosen may be one that is larger than a default image of a cursor, or that is larger than an image that was previously specified (e.g., a result of a previous editing of the markup language document to increase the display size of the cursor). The magnification facility may, in some embodiments, select between different images that may be referenced based on the zoom level at which the cursor is to be applied, by picking between cursors that have different sizes. The magnification facility may also select between images based on a type of cursor to be displayed. Different cursor images may be displayed in embodiments, including arrows, hands, cross-hairs, and other images. The markup language document may specify a type of cursor to be used at a time, such as the type of cursor that is to be used when the cursor is over a display of the markup language document or a portion of the markup language document. In this case, the magnification facility may select between images that display different types of cursors based on the cursor that the markup language document indicates (e.g., in one or more markup elements) should be used.

Those skilled in the art will appreciate that cursor images may be formatted in different ways, including as raster images and vector images. Any suitable type of image may be used in embodiments, as embodiments are not limited in this respect. In some embodiments, the magnification facility may specify a vector image that is defined in a Scalable Vector Graphics (SVG) format. The SVG format allows for raster images to be displayed at various sizes and re-rendered for each size, to permit raster images of various sizes to be generated without loss of quality of clarity in the raster image from resizing. Vector images may not be supported by all viewing applications, however. In some embodiments that use vector images, raster images (e.g., in a CUR format) may be pre-generated from the vector images for a variety of zoom levels and may be available. The magnification facility may then, upon determining that it is being executed by a viewing application that does not support vector images, edit markup elements to specify one of the pre-generated raster images.

SVG images are known in the art and will not be discussed in detail herein. However, an example of SVG defining a cursor is:

```
<svg version="1.1" xmlns="http://www.w3.org/2000/svg"
xmlns:xlink="http://www.w3.org/1999/xlink" x="0px" y="0px" '+
'width='"'+(128*pixelRatio)+'px" eight='"'+(128*pixelRatio)+'px"
viewBox="0,0,'+(128*pixelRatio)+','+(128*pixelRatio)+'">
    <defs>
        <filter id="d" x="0" y="0" width="200%" height="200%">
            <feOffset result="offOut" in="SourceAlpha" dx=".25"
            dy=".5" />
            <feGaussianBlur result="blurOut" in="offOut"
            stdDeviation=".5" />
            <feBlend in="SourceGraphic" in2="blurOut"
            mode="normal" />
        </filter>
    </defs>
    <g transform=" '+ 'scale('+(size)+','+(size)+')"
    filter="url(#d)">
        <path fill="#000" d="M0,0 L0,17.75 L4.188,13.875
        L8.25,21.062 L11.531,18.719 L7.75,12.062 L12.594,12 L0,0
        z" />
        <path fill="#FFF" d="M0.931,2.277 L1,15.062 L4.281,12
        L8.562,19.469 L10.156,18.406 L5.875,11.062 L10.062,11
        L0.931,2.277 z" />
    </g>
</svg>
```

In this example, the "pixelRatio" and "size" variables may be used to control the size at which the cursor is rendered, to permit generation of raster data displaying the cursor at different levels of magnification. The magnification facility may, when editing a markup element to specify that an SVG image generated using the content above should be dis-played (e.g., displayed when a condition is met), edit the SVG image (e.g., the content above) to specify a value, or pass a value along with the SVG image to be used in generating a raster image.

The editing of block 806 may include any suitable editing of markup elements, including the insertion of markup elements specifying the cursor image. For example, in a case that raster images are used, a CSS markup element "cursor: url(hand2x.png);" may be inserted. As another example, in a case that SVG images are used, the following markup element may be inserted:

```
cursor: -webkit-image-set(
    url('path/to/image') 1x,
    url('path/to/high-res-image') 2x
), auto;
```

Once the editing of block 806 is completed, the process 800 ends.

While the example of FIG. 8 included specifying a mouse cursor, the example did not describe in detail how multiple mouse cursors may be specified. In some cases, for example, multiple different images (e.g., SVG images) may be specified for a cursor, which may be alternative images for a cursor, such as pointer cursors, hand cursors, cross-hair cursors, or other types of cursors. In some such embodiments, the different cursors may be specified because the different types of cursors are to be displayed by a viewing application under different conditions. For example, a default cursor for a viewing application like a web browser may be an arrow cursor, but when the cursor is positioned over an interactive element such as a hyperlink or button, a hand cursor may be displayed. These are default behaviors of a viewing application like a web browser, but a markup language document may specify alternative behaviors, such as alternative types of cursors that are to be displayed at times or different conditions under which the different types of cursors are to be displayed. In some embodiments, the magnification facility may edit a markup language document to specify multiple different types of cursors, as well as to specify conditions under which the different types of cursors are to be displayed. For example, in some embodiments the magnification facility may insert markup elements corresponding to default behavior of a web browser, such as specifying that one type of SVG image that produces an arrow is to be displayed by default and specifying that another type of SVG image that produces a hand is to be displayed when the cursor is over an interactive element. As another example, the magnification facility may review the markup elements of a markup language document, such as using techniques discussed above in connection with FIGS. 6D-7, to identify markup elements that affect a display of a cursor, including conditions under which different types of cursors are to be displayed. The magnification facility may then edit the markup language document to specify that different SVG images, corresponding to the images specified by the markup language document, should be displayed under the conditions specified by the markup language document. For example, the markup language document may include markup elements specifying, for example, that a first type of cursor is to be displayed when a condition is met (e.g., cursor is hovering over a hyperlink) and the magnification facility may insert a corresponding markup element specifying that an SVG image or raster corresponding to that type of cursor is to be displayed when that condition is met.

As should be appreciated from the foregoing, in some embodiments the magnification facility may be implemented as scripting language code that is incorporated into a markup language document, such as code that is incorporated into an HTML document. In some such cases, the magnification facility may be incorporated into the markup language manually, by a developer (e.g., a web developer) that creates the markup language document. The magnification facility may be incorporated by a developer in cases where the developer expects that a substantial number of users of the markup language document may benefit from use of the magnification facility, such as in a case that many of the users will have difficulties or disabilities in eyesight.

In other embodiments, however, the magnification facility may be incorporated into the markup language document automatically, such as by an insertion facility that is configured to insert the magnification facility into markup language documents. The insertion facility may be implemented in any suitable manner, as embodiments are not limited in this respect. In some embodiments, for example, the insertion facility may be implemented as part of a proxy server or other server that relays markup language documents. The proxy server may, for example, be a server that is intended for use by users who have difficulties or disabilities with eyesight. These users may access markup language documents via the proxy server such that the proxy server relays the documents to the devices after the proxy server has edited the documents to insert the magnification facility, such that the magnification facility is available for use by the users. Such a proxy server may be used in any suitable manner, including known techniques. As one example, a viewing application (e.g., web browser) may be configured to access markup language documents via the proxy server.

As another example of a manner in which an insertion facility may operate to incorporate the magnification facility into the markup language document, the insertion facility may be implemented as a portion of a viewing application, such as a plug-in to a viewing application, that is executed on a device operated by a user. When the user operates the viewing application to download and process markup language documents, the insertion facility may edit the markup language documents to incorporate the magnification facility.

Figure 9:
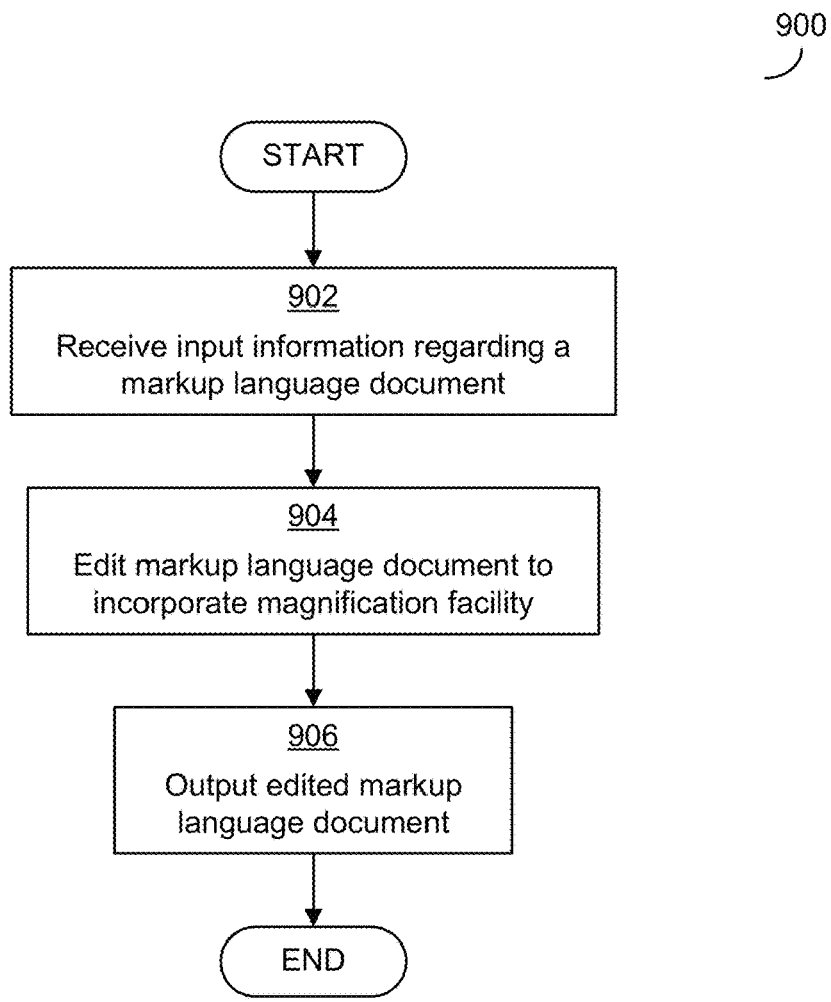
FIG. 9 is a flowchart of an illustrative process that may be implemented by a magnification facility to insert a magnification facility into one or more markup language documents.

FIG. 9 illustrates an example of a process that an insertion facility may carry out in some embodiments to incorporate a magnification facility into a markup language document. The process 900 of FIG. 9 begins in block 902, in which the insertion facility receives input information regarding a markup language document. The information received in block 902 may be the markup language document itself or information describing the markup language document, such as an address from which the markup language document may be downloaded. If the insertion facility does not receive the markup language document in block 902, the insertion facility downloads the markup language document. In block 904, the insertion facility edits the markup language document to incorporate the magnification facility. As discussed above, the markup language document may be incorporated in any suitable manner, including by being inserted entirely into the markup language document or by being disposed in one or more other files that is/are referenced by one or more markup elements of the markup language document. Once the edited of block 904 is completed, in block 906 the insertion facility outputs the edited markup language document, such as by passing the edited markup language document to another component of a viewing application to be processed or by communicating the edited markup language document over a network. After the output of block 906, the process 900 ends.

Figure 10:
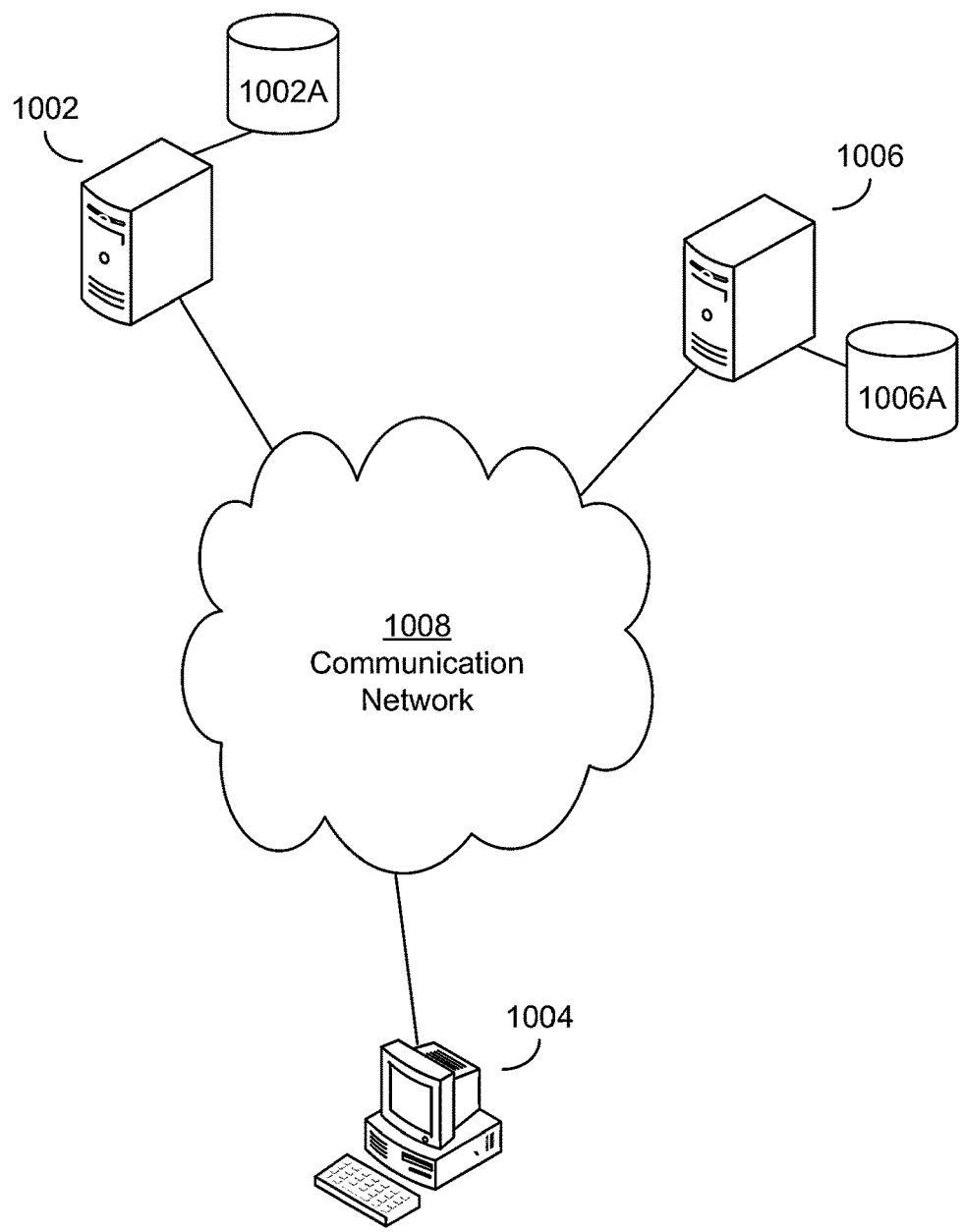
FIG. 10 is a sketch of an example of a computer system in which some embodiments may operate.

FIG. 10 illustrates an example of a computer system in which some embodiments may operate. The computer system of FIG. 10 includes a computing device 1002 that includes a data store 1002A. While computing device 1002 is illustrated as a single server, it should be appreciated that it may be implemented as any suitable one or more computing devices that may communicate over a communication network, as embodiments are not limited in this respect. Data store 1002A may also be implemented in any suitable manner. Data store 1002A may store one or more markup language documents. The computer system also includes a computing device 1004 that may execute a viewing application that is operated by a user to download, process, and display a markup language document. While the computing device 1004 is illustrated in FIG. 10 as a desktop personal computer, it should be appreciated that embodiments are not so limited and that the device 1004 may be implemented as a laptop personal computer, a smart phone, a tablet computer, a gaming device, a web-enabled television, or any number of other devices that may be operated by users to download, process, and view markup language documents. In some embodiments, the computing device 1004 may communicate directly with the computing device 1002 to request a markup language document stored in the data store 1002A. In other embodiments, as discussed above in connection with FIG. 9, the computing device 1004 may request the markup language document via an intermediary computing device 1006. The intermediary computing device 1006, which may be implemented as any suitable computing device, may have a data store 1006A that stores a magnification facility. The intermediary computing device 1006 may act as a relay for markup language documents between the device 1002 and the device 1004 and may, as part of the relay, edit the markup language document to insert a magnification facility. Communications between the devices 1002, 1004, and 1006 may be exchanged via a communication network 1008, which may be any suitable one or more wired and/or wireless computer networks, including local area networks, wide area networks, and/or the Internet.

Techniques operating according to the principles described herein may be implemented in any suitable manner. Included in the discussion above are a series of flow charts showing the steps and acts of various processes that select and apply a zoom technique for increasing a display size of visible content elements of a markup language document so as to preserve a layout or readability of the markup language document. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1106, 1206 of FIGS. 11 and 12 described below (i.e., as a portion of computing devices 1100 or 1200) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 10, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register or a computer-readable storage medium accessible via a bus, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 11:
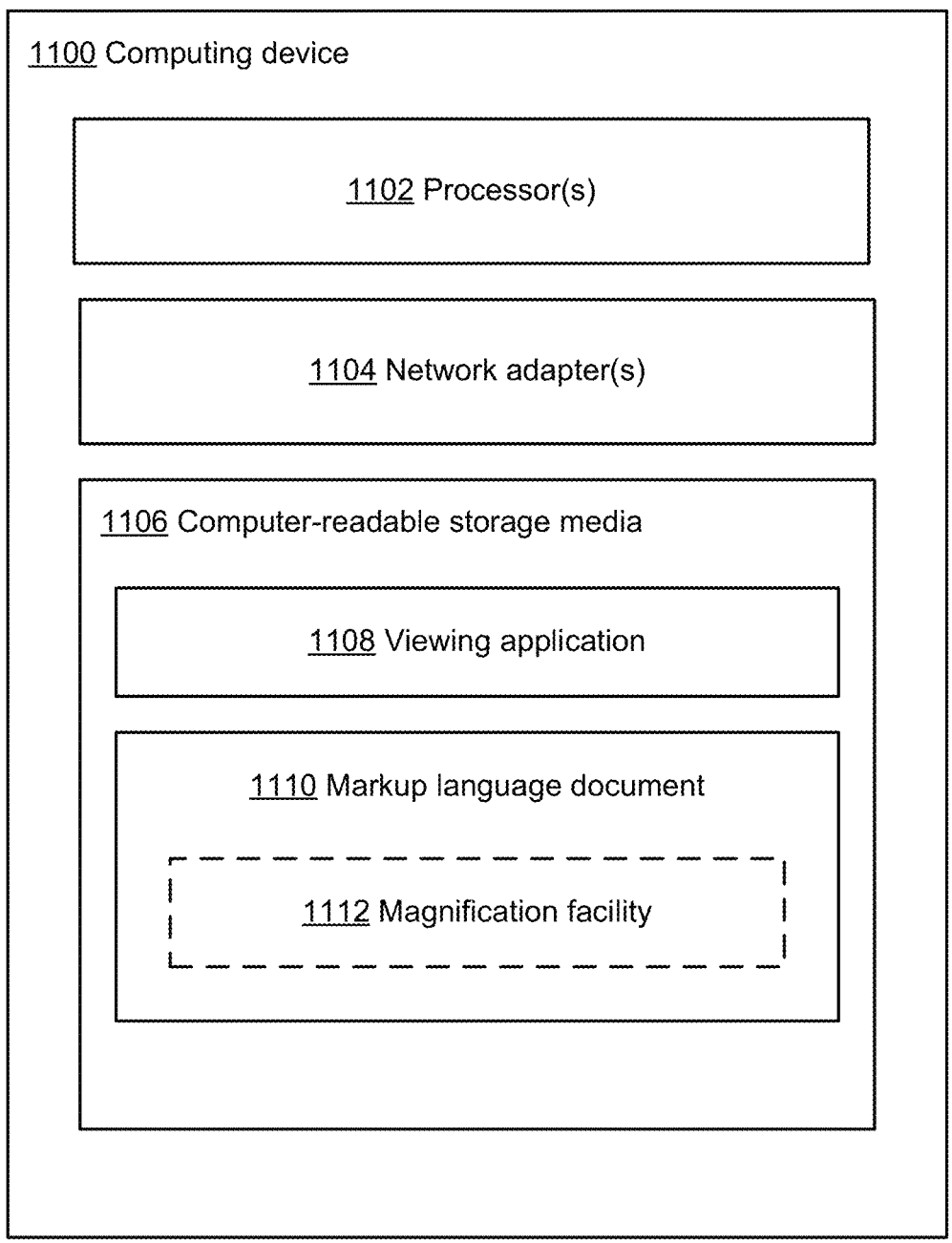
FIG. 11 is a block diagram of some components of a computing device with which some embodiments may operate.

FIG. 11 illustrates one exemplary implementation of a computing device in the form of a computing device 1100 that may be used in a system implementing techniques described herein, although others are possible. It should be appreciated that FIG. 11 is intended neither to be a depiction of necessary components for a computing device to operate as a client computing device, operated by a user, in accordance with the principles described herein, nor a comprehensive depiction.

Computing device 1100 may comprise at least one processor 1102, a network adapter 1104, and computer-readable storage media 1106. Computing device 1100 may be, for example, a desktop or laptop personal computer, a personal digital assistant (PDA), a smart mobile phone, a server, a gaming device, or any other suitable computing device. Network adapter 1104 may be any suitable hardware and/or software to enable the computing device 1100 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1106 may be adapted to store data to be processed and/or instructions to be executed by processor 1102. Processor 1102 enables processing of data and execution of instructions. The data and instructions may be stored on the computer-readable storage media 1106.

The data and instructions stored on computer-readable storage media 1106 may comprise computer-executable instructions implementing techniques which operate according to the principles described herein. In the example of FIG. 11, computer-readable storage media 1106 stores computer-executable instructions implementing various facilities and storing various information as described above. Computer-readable storage media 1106 may store a viewing application 1108, which may implement known techniques for processing one or more markup language documents. The media 1106 may additionally store a markup language document 1110 into which a magnification facility 1112 is incorporated.

Figure 12:
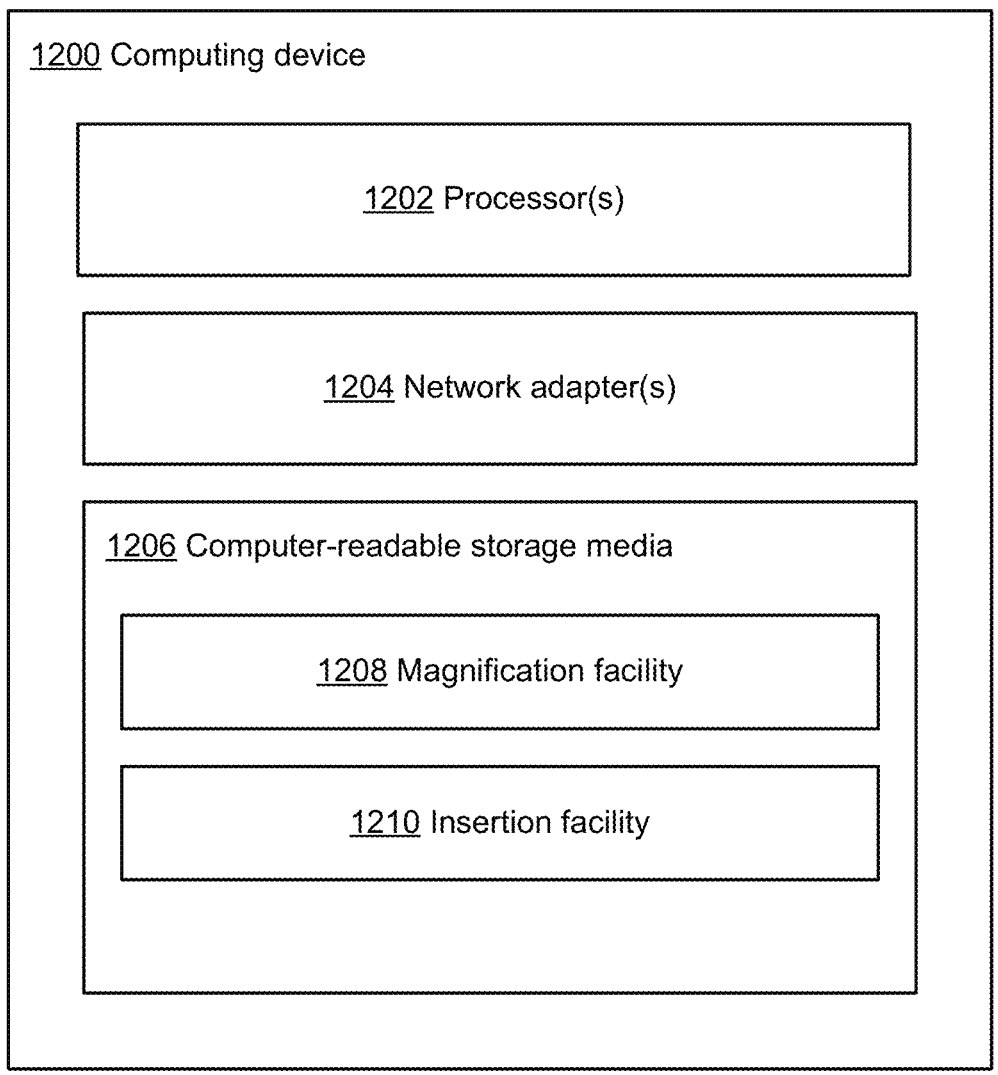
FIG. 12 is a block diagram of some components of a computing device with which some embodiments may operate.

FIG. 12 illustrates one exemplary implementation of a computing device in the form of a computing device 1200 that may be used in a system implementing techniques described herein, although others are possible. It should be appreciated that FIG. 12 is intended neither to be a depiction of necessary components for a computing device to operate as a server (e.g., device 1002 of FIG. 10) or as an intermediary computing device (e.g., device 1006 of FIG. 10), to insert a magnification facility into a markup language document, in accordance with the principles described herein, nor a comprehensive depiction.

Computing device 1200 may comprise at least one processor 1202, a network adapter 1204, and computer-readable storage media 1206. Computing device 1200 may be, for example, a desktop or laptop personal computer, a personal digital assistant (PDA), a smart mobile phone, a server, a gaming device, or any other suitable computing device. Network adapter 1204 may be any suitable hardware and/or software to enable the computing device 1200 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1206 may be adapted to store data to be processed and/or instructions to be executed by processor 1202. Processor 1202 enables processing of data and execution of instructions. The data and instructions may be stored on the computer-readable storage media 1206.

The data and instructions stored on computer-readable storage media 1206 may comprise computer-executable instructions implementing techniques which operate according to the principles described herein. In the example of FIG. 12, computer-readable storage media 1206 stores computer-executable instructions implementing various facilities and storing various information as described above. Computer-readable storage media 1206 may store a magnification facility 1208. The media 1206 may additionally store an insertion facility 1210 to incorporate the magnification facility into a markup language document.

While not illustrated in FIGS. 11 and 12, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method of displaying magnified content on a graphic user interface displayed on a computer display, the method comprising:

accessing a markup language document, the markup language document having a plurality of visible content elements, wherein at least one visible content element includes a column having a set of text;

displaying the markup language document at a first current magnification level on the computer display;

responsive to an instruction to increase the first current magnification level to a second increased magnification level, determining whether displaying the markup language document at the second increased magnification level using a first default zoom technique would result in a first visible content element of the plurality of visible content elements being at least partially obscured, wherein the first visible content element of the plurality of visible content elements is identified as at least partially obscured when the set of text in the column would contain fewer than a predefined threshold number of alphanumerical characters or words per line of text;

responsive to the determining that, at the second increased magnification level, the first visible content element is identified as at least partially obscured, automatically switching, without an end user input, from the first default zoom technique to a second zoom technique different from the first default zoom technique, wherein, at the second increased magnification level, the second zoom technique prevents the set of text from containing less than the predefined threshold number of alphanumerical characters or words per line of text;

after the switching, applying the second zoom technique to the markup language; and displaying the markup language document at the second increased magnification level using the second zoom technique.

2. The method of claim 1, wherein displaying the first visible content element at the second increased magnification level comprises inserting a new markup element into the markup language document.

3. The method of claim 1, wherein the instruction to increase the first current magnification level to the second increased magnification level is generated responsive to a user input.

4. The method of claim 1, wherein the step of determining whether the first visible content element is at least partially obscured comprises determining whether a second visible content element overlaps the first visible content element.

5. The method of claim 1, wherein determining whether the first visible content element is at least partially obscured comprises calculating a numeric score based at least in part on a display area of the first visible content element.

6. The method of claim 1, further comprising the steps of determining an obscured display area for each of the plurality of visible content elements that is at least partially obscured at the second increased magnification level.

7. The method of claim 6, wherein determining the obscured display area comprises the step of calculating a ratio of a total display area of the computer display to a total obscured display area.

8. The method of claim 1, further comprising:
identifying a threshold magnification level exceeding which results in the first visible content element being obscured.

9. The method of claim 8, wherein the step of identifying the threshold is executed prior to receipt of the instruction to increase the first current magnification level to the second increased magnification level.

10. The method of claim 1, wherein the markup language document is a web page.

11. A non-transitory computer-readable storage medium having encoded thereon executable instructions that, when executed by at least one processor, cause the at least one processor to carry out a method of displaying magnified content on a graphic user interface displayed on a computer display, the method comprising:

accessing a markup language document, the markup language document having a plurality of visible content elements, wherein at least one visible content element includes a column having a set of text;

displaying the markup language document at a first current magnification level on the computer display;

responsive to an instruction to increase the first current magnification level to a second increased magnification level, determining whether displaying the markup language document at the second increased magnification level using a first default zoom technique would result in a first visible content element of the plurality of visible content elements being at least partially obscured, wherein the first visible content element of the plurality of visible content elements is identified as at least partially obscured when the set of text in the column would contain fewer than a predefined threshold number of alphanumerical characters or words per line of text;

responsive to the determining that, at the second increased magnification level, the first visible content element is identified as at least partially obscured, automatically switching, without an end user input, from the first default zoom technique to a second zoom technique different from the first default zoom technique, wherein, at the second increased magnification level, the second zoom technique prevents the set of text from containing less than the predefined threshold number of alphanumerical characters or words per line of text;

after the switching, applying the second zoom technique to the markup language; and displaying the markup language document at the second increased magnification level using the second zoom technique.

12. The at least one computer-readable storage medium of claim 11, wherein the method further comprises: identifying a threshold magnification level exceeding which results in the first visible content element being obscured.

13. An apparatus comprising:
at least one processor; and
at least one non-transitory computer-readable storage medium having encoded thereon executable instructions that, when executed by at least one processor, cause the at least one processor to carry out a method of displaying magnified content on a graphic user interface displayed on a computer display, the method comprising:

accessing a markup language document, the markup language document having a plurality of visible content elements, wherein at least one visible content element includes a column having a set of text;

displaying the markup language document at a first current magnification level on the computer display;

responsive to an instruction to increase the first current magnification level to a second increased magnification level, determining whether displaying the markup language document at the second increased magnification level using a first default zoom technique would result in a first visible content element of the plurality of visible content elements being at least partially obscured, wherein the first visible content element of the plurality of visible content elements is identified as at least partially obscured when the set of text in the column would contain fewer than a predefined threshold number of alphanumerical characters or words per line of text;

responsive to determining that, at the second increased magnification level, the first visible content element is at least partially obscured, automatically switching, without an end user input, from the first default zoom technique to a second zoom technique different from the first default zoom technique, wherein, at the second increased magnification level, the second zoom technique prevents the set of text from containing less than the predefined threshold number of alphanumerical characters or words per line of text; and displaying the markup language document at the second increased magnification level using the second zoom technique.

14. The apparatus of claim 13, wherein the method further comprises:

identifying a threshold magnification level exceeding which results in the first visible content element being obscured.

15. The apparatus of claim 13, wherein determining whether the first visible content element is at least partially obscured comprises calculating a numeric score based at least in part on a display area of the first visible content element.

* * * * *